US012695778B2

(12) United States Patent (10) Patent No.: US 12,695,778 B2
Stride et al. (45) Date of Patent: Jul. 28, 2026

(54) CONTEXTUALIZED CYBER SECURITY AWARENESS TRAINING

(71) Applicant: Darktrace Holdings Limited, Cambridge (GB)

(72) Inventors: Constance Stride, Cambridge (GB); Stephen Pickman, Huntingdon (GB); Matthew Ferguson, Burton on Trent (GB); Matt Dunn, Ely (GB); Ben Akrill, Cambridge (GB); Daisy Butler, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 8 days.

(21) Appl. No.: 18/778,147

(22) Filed: Jul. 19, 2024

(65) Prior Publication Data

US 2025/0030744 A1 Jan. 23, 2025

Related U.S. Application Data

(60) Provisional application No. 63/528,009, filed on Jul. 20, 2023.

(51) Int. Cl.
H04L 9/40 (2022.01)
G06F 21/50 (2013.01)
(Continued)

(52) U.S. Cl.
CPC .......... H04L 63/1433 (2013.01); G06F 21/50 (2013.01); G06N 20/00 (2019.01);
(Continued)

(58) Field of Classification Search
CPC ..... H04L 63/1433; H04L 41/16; H04L 63/08; H04L 63/1441; H04L 63/20; G06F 21/50
(Continued)

(56) References Cited

U.S. PATENT DOCUMENTS 6,735,701 B1 * 5/2004 Jacobson ............ H04L 63/0227
726/1
10,917,439 B2 * 2/2021 Purathepparambil ......................
H04L 63/205
(Continued)

*Primary Examiner* — Dant B Shaifer Harriman
(74) *Attorney, Agent, or Firm* — Rutan and Tucker, LLP

(57) ABSTRACT

A security awareness training system can include a recognition module, a mapping module, a customized training module, and an authentication module. The recognition module can detect when behavioral activity by an end user on an endpoint device creates one or more of i) a model breach indicative of a potential cyber threat and ii) a violation of a network policy, an email policy, or a cloud policy. The authentication module can cooperate with the recognition module to provide just-in-time cyber security awareness training on a display screen of the endpoint device associated with that specific end user, at a time when the behavioral activity by the end user on the endpoint device creates the one or more of i) the model breach indicative of the potential cyber threat and ii) the violation of the network policy, the email policy, or the cloud policy. The authentication module can cooperate with a mapping module and a customized training module to provide the just-in-time cyber security awareness training on the endpoint device associated with that specific end user at the time when the behavioral activity by the end user on the endpoint device triggers a need for the cyber security awareness training, which causes more relevant and better learning for the end user. The mapping module can correlate the just-in-time cyber security awareness training to the behavioral activity by the end user on the endpoint device that created the model breach and/or the violation.

20 Claims, 10 Drawing Sheets

(51) Int. Cl.
   *G06N 20/00* (2019.01)
   *H04L 41/16* (2022.01)
(52) U.S. Cl.
   CPC .............. *H04L 41/16* (2013.01); *H04L 63/08* (2013.01); *H04L 63/1441* (2013.01); *H04L 63/20* (2013.01)
(58) Field of Classification Search
   USPC ........................................................... 726/1
   See application file for complete search history.

(56)                   References Cited

U.S. PATENT DOCUMENTS

| | | | |
|---|---|---|---|
| 2010/0125911 A1* | 5/2010 | Bhaskaran ............. | G06Q 10/10 |
| | | | 715/781 |
| 2019/0124117 A1* | 4/2019 | Swafford ............ | H04L 63/1408 |
| 2020/0396190 A1* | 12/2020 | Pickman ............... | H04L 67/306 |
| 2021/0103808 A1* | 4/2021 | Armstrong .......... | H04L 63/1416 |
| 2023/0135660 A1* | 5/2023 | Chapman ....... | G06Q 10/063114 |
| | | | 705/7.38 |
| 2023/0412626 A1* | 12/2023 | Wright .................... | H04L 41/16 |
| 2024/0056486 A1* | 2/2024 | Lowenhardt ............ | H04L 41/16 |
| 2025/0030744 A1* | 1/2025 | Stride ................. | H04L 63/1433 |

* cited by examiner

203

Authentication module
213

Recognition module
223

Mapping module
233

Customized training module
243

Feedback module
253

Tracking module
263

User Interface module
273

A Security Awareness Training system

Cyber Security
Restoration Engine 190
and/or Cyber-attack
Simulator 105

FIG 7B

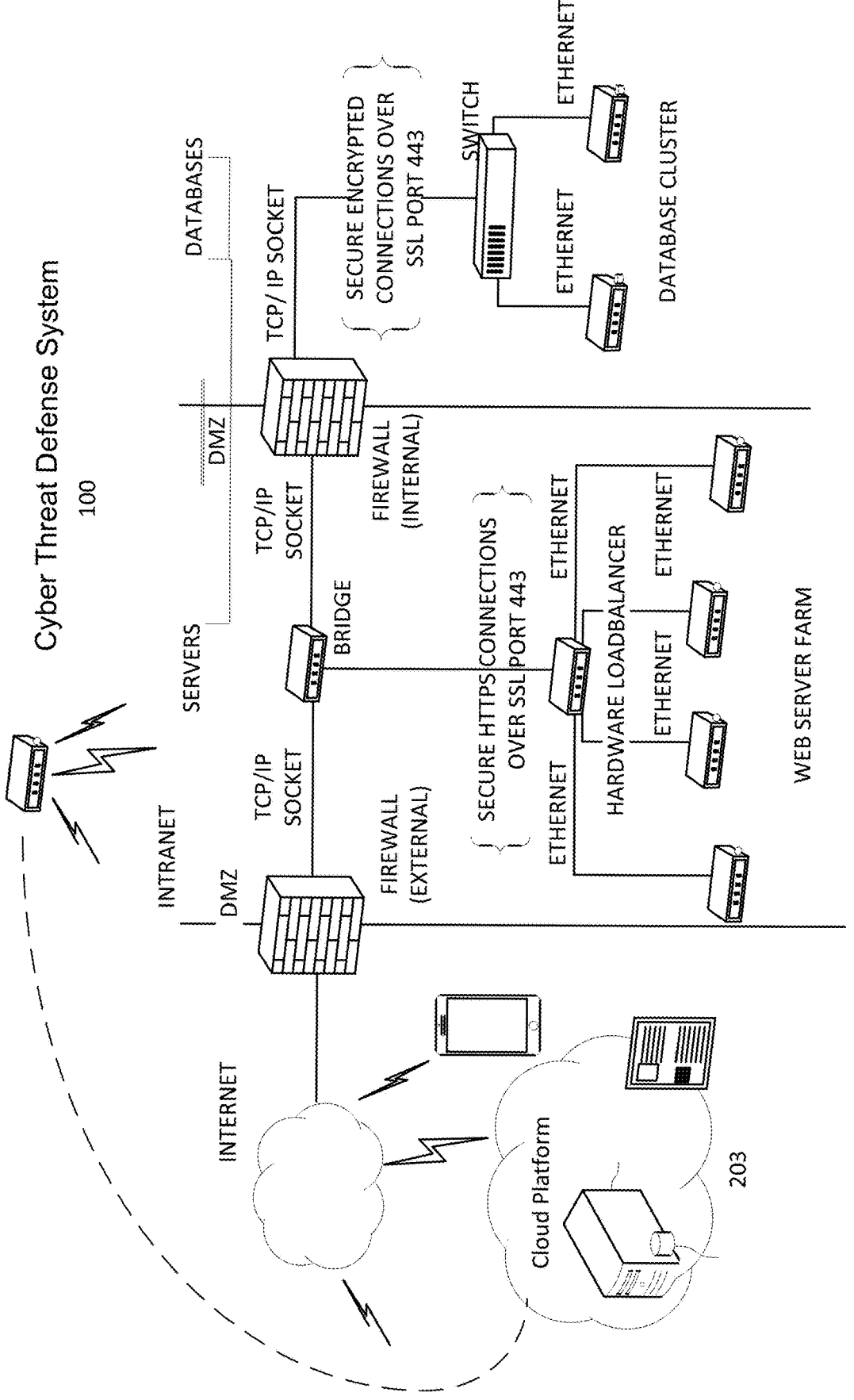
FIG. 8 Network

CONTEXTUALIZED CYBER SECURITY AWARENESS TRAINING

RELATED APPLICATION

This application claims priority under 35 USC 119 to U.S. provisional patent application 63/528,009, titled "CYBER SECURITY LOOP" filed Jul. 20, 2023, which the disclosure of such is incorporated herein by reference in its entirety.

NOTICE OF COPYRIGHT

FIELD

Cyber security and in an embodiment use of Artificial Intelligence in cyber security.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). A cyber threat from a cyberattack may involve malicious software, an insider attack, and other threat introduced into a computing device and/or the network. The cyber threats may further represent malicious or criminal activity, ranging from theft of credential to even a nation-state attack, where the source initiating or causing the security threat is commonly referred to as a "malicious" source.

SUMMARY

Methods, systems, and apparatus are disclosed for an Artificial Intelligence-based cyber security system. In an embodiment, a security awareness training system can include a recognition module, a mapping module, a customized training module, and an authentication module. The recognition module can detect when behavioral activity by an end user on an endpoint device creates one or more of i) a model breach indicative of a potential cyber threat and ii) a violation of a network policy, an email policy, or a cloud policy. The authentication module can cooperate with the recognition module to provide just-in-time cyber security awareness training on a display screen of the endpoint device associated with that specific end user, at a time when the behavioral activity by the end user on the endpoint device creates the one or more of i) the model breach indicative of the potential cyber threat and ii) the violation of the network policy, the email policy, or the cloud policy. The authentication module can cooperate with a mapping module and a customized training module to provide the just-in-time cyber security awareness training on the endpoint device associated with that specific end user at the time when the behavioral activity by the end user on the endpoint device triggers a need for the cyber security awareness training, which causes more relevant and better learning for the end user. The mapping module can correlate the just-in-time cyber security awareness training to the behavioral activity by the end user on the endpoint device that created the model breach and/or the violation.

These and other features of the design provided herein can be better understood with reference to the drawings, description, and claims, all of which form the disclosure of this patent application.

DRAWINGS

The drawings refer to some embodiments of the design provided herein in which.

Figure 5:
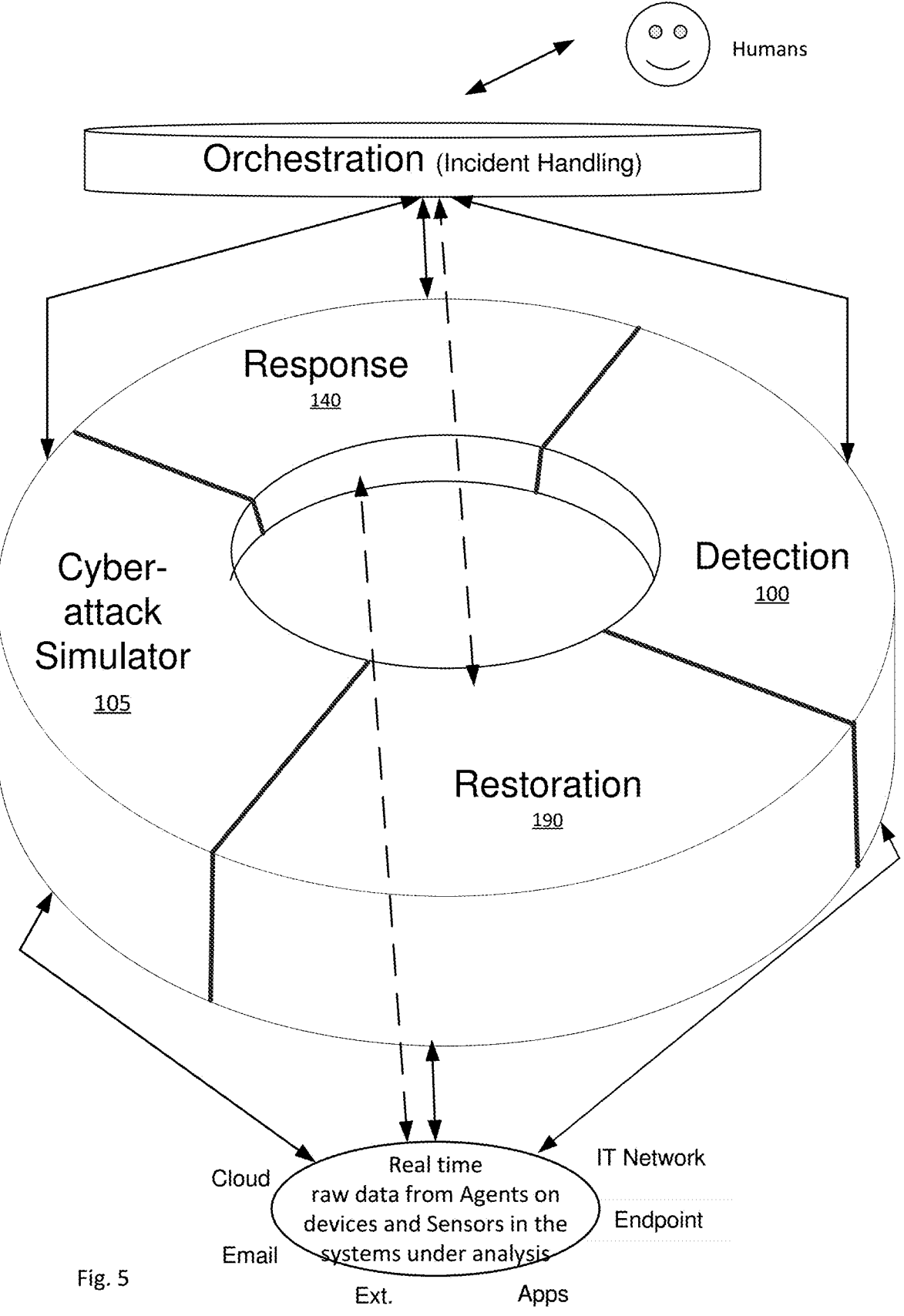

FIG. 5 illustrates a diagram of an embodiment of i) the cyber threat detection engine using Artificial Intelligence algorithms trained to perform a first machine-learned task of detecting the cyber threat, ii) an autonomous response engine using Artificial Intelligence algorithms trained to perform a second machine-learned task of taking one or more mitigation actions to mitigate the cyber threat, iii) a cyber-security restoration engine using Artificial Intelligence algorithms trained to perform a third machine-learned task of remediating the system being protected back to a trusted operational state, and iv) a cyber-attack simulator using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together.

Figure 6:
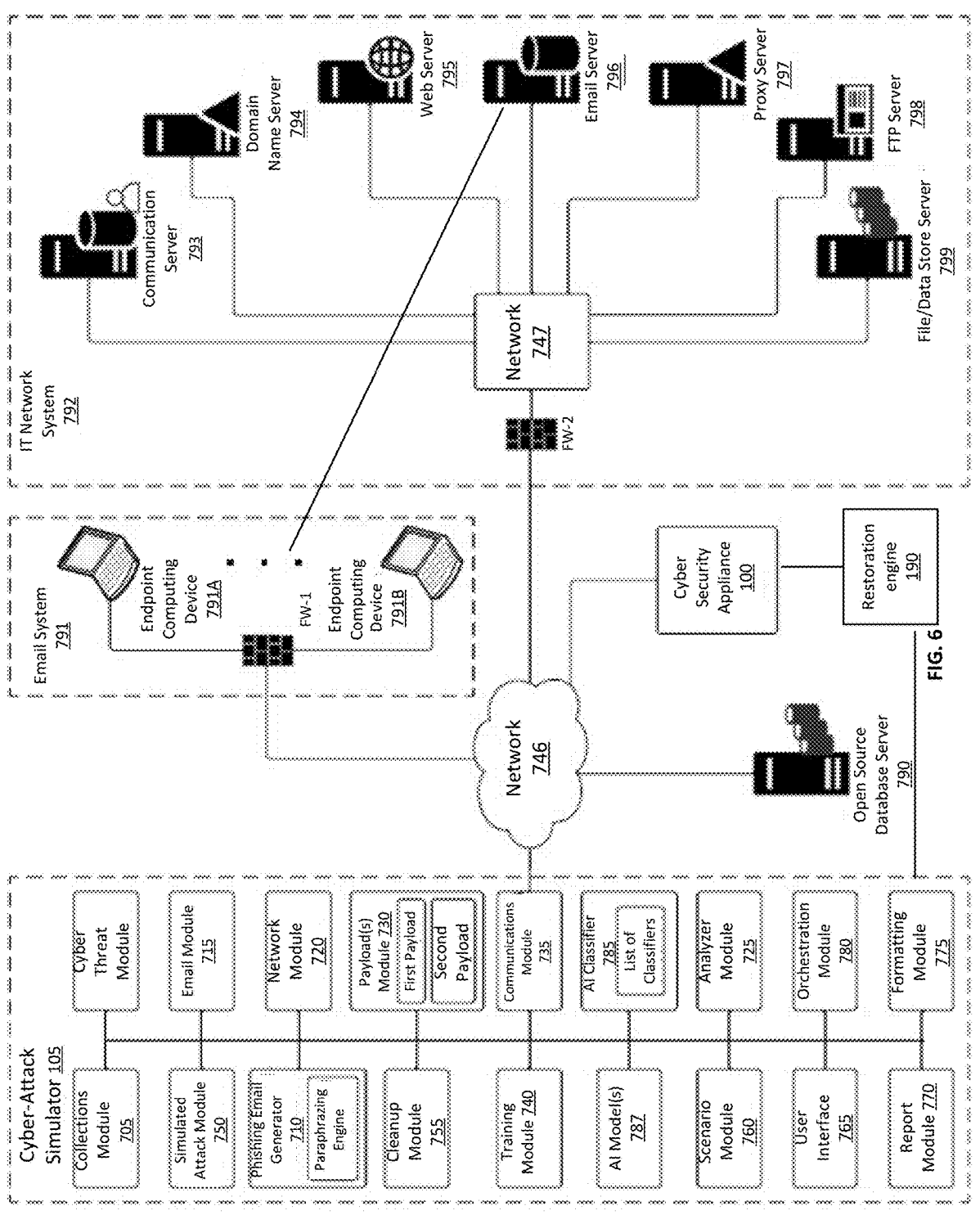

FIG. 6 illustrates a block diagram of an embodiment of the cyber-attack simulator with Artificial Intelligence-based simulations conducted in the cyber-attack simulator by constructing a graph of nodes of the system being protected (e.g. a network) including i) the physical devices connecting to the network, any virtualized instances of the network, user accounts in the network, email accounts in the network, etc. as well as ii) connections and pathways through the network to create a virtualized instance of the network to be tested.

Figure 7A:
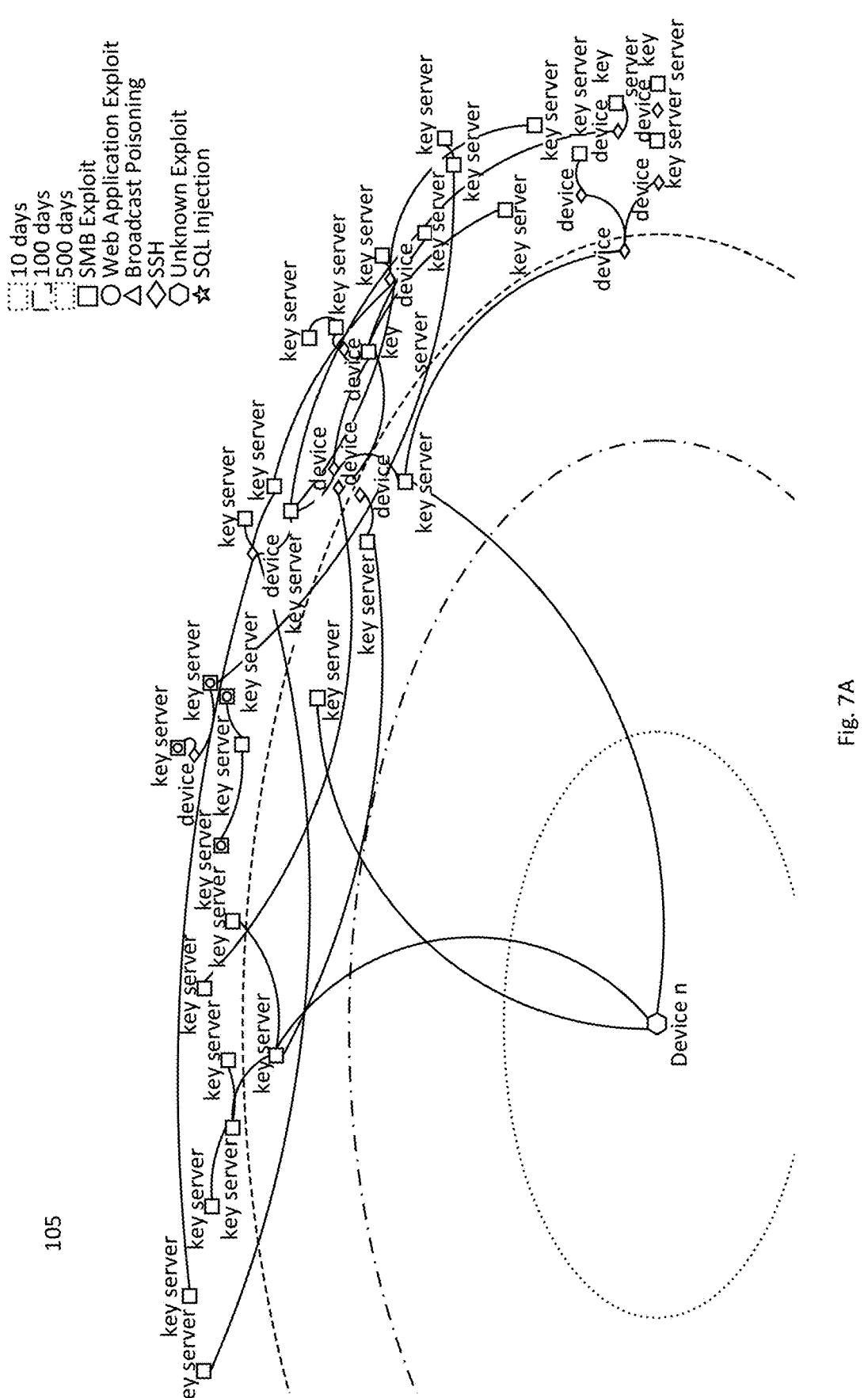

FIG. 7A illustrates a diagram of an embodiment of the cyber-attack simulator and its Artificial Intelligence-based simulations constructing an example graph of nodes in an example network and simulating how the cyberattack path might likely progress in the future tailored with an innate understanding of a normal behavior of the nodes in the system being protected and a current operational state of each node in the graph of the protected system during simulations of cyberattacks.

Figure 7B:
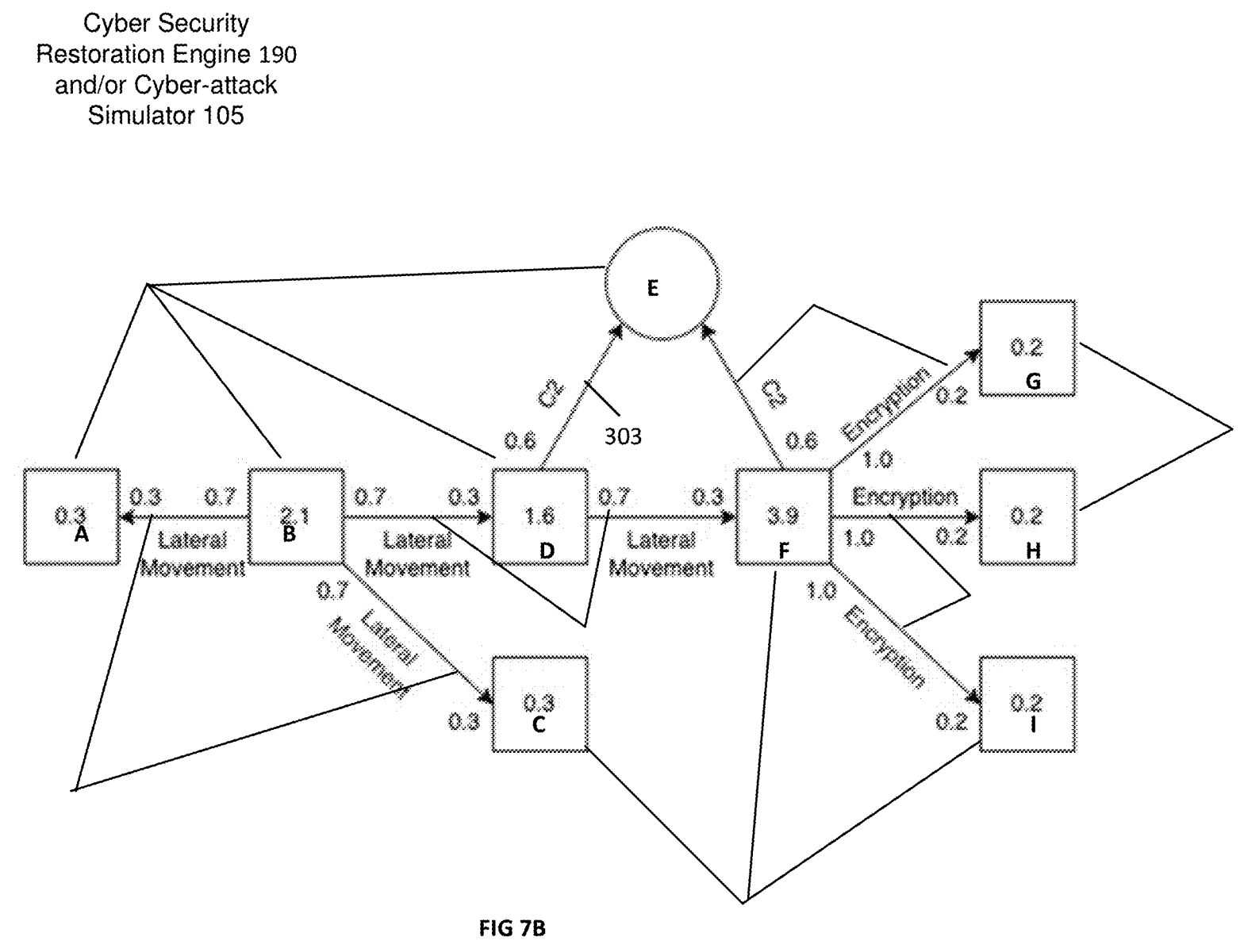

FIG. 7B illustrates a diagram of an embodiment of the cyber-attack simulator and/or the cyber-attack restoration engine assigning scores for a portion of the graph of nodes of the system being protected (e.g. a network) including i) the physical devices, accounts, etc. in the system, etc. as well as ii) connections and attack pathways through the network.

FIG. 8 illustrates a block diagram of an embodiment of the AI-based cyber security appliance with the security awareness training system and other Artificial Intelligence-based engines plugging in to protect a system.

Figure 9:
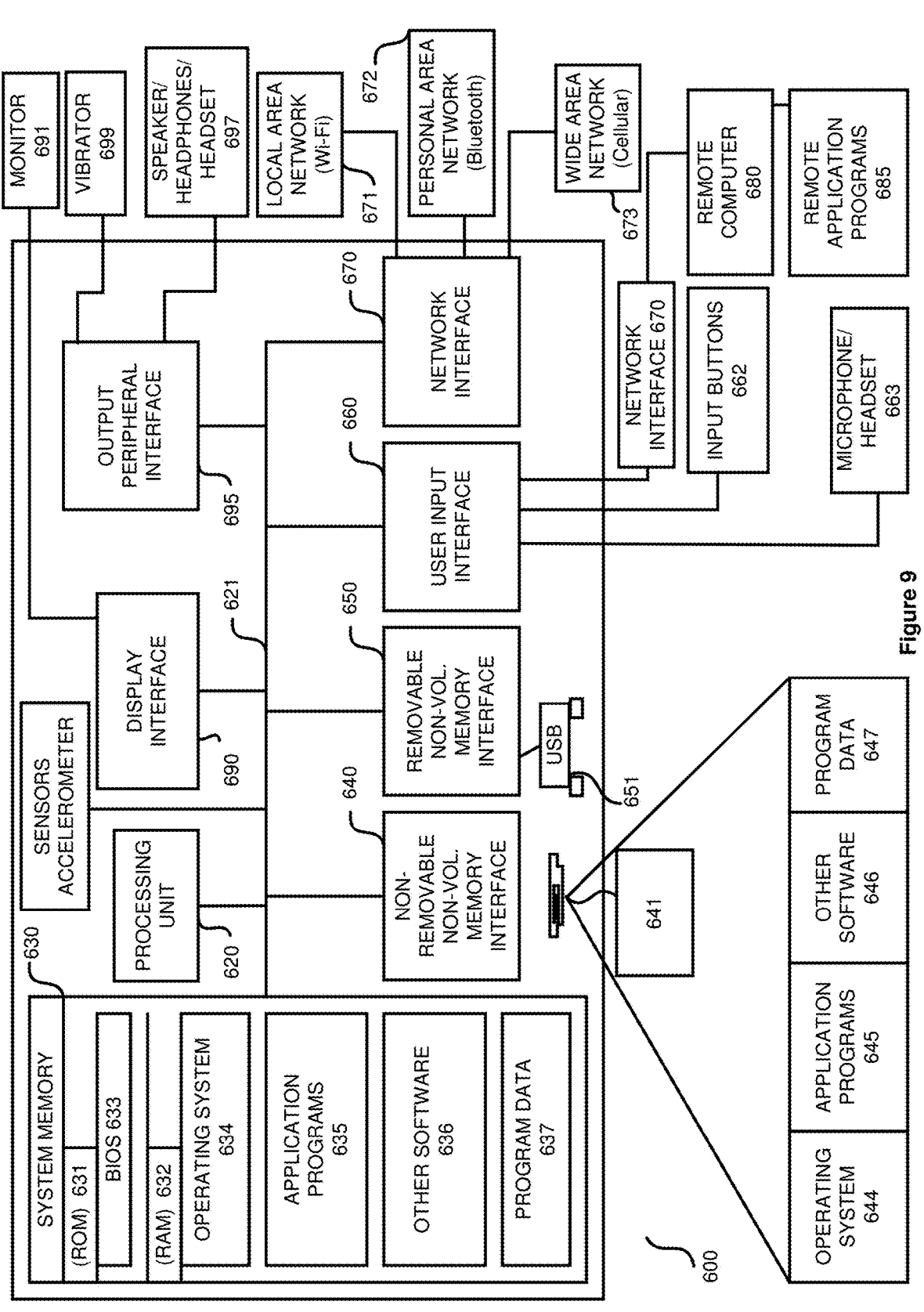

FIG. 9 illustrates a block diagram of an embodiment of one or more computing devices that can be a part of the Artificial Intelligence-based cyber security system including the multiple Artificial Intelligence-based engines and the security awareness training system discussed herein.

While the design is subject to various modifications, equivalents, and alternative forms, specific embodiments thereof have been shown by way of example in the drawings and will now be described in detail. It should be understood that the design is not limited to the particular embodiments disclosed, but-on the contrary-the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design.

Figure 1:
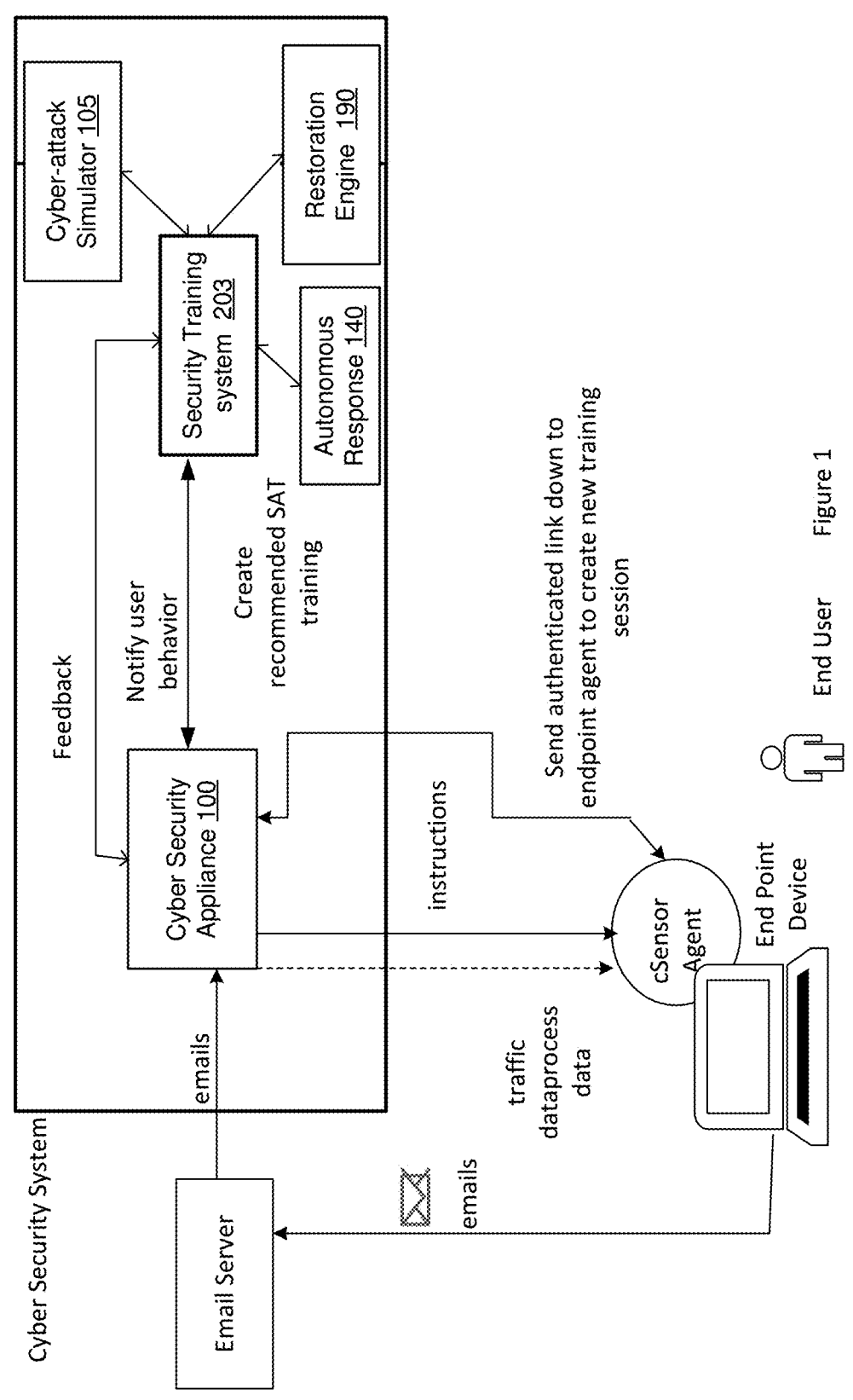
FIG. 1 illustrates a block diagram of an embodiment of an example security awareness training system interacting with an endpoint agent in the endpoint device as well as other components in the cyber security system including the cyber security appliance protecting the network, the autonomous response engine, the cyber-attack simulator, and the cyber-attack restoration engine.

FIG. 1 illustrates a block diagram of an embodiment of an example security awareness training system interacting with an endpoint agent in the endpoint device as well as other components in the cyber security system including the cyber security appliance protecting the network, the autonomous response engine, the cyber-attack simulator, and the cyber-attack restoration engine. The authentication module 213 can cooperate with the recognition module 223 to provide just-in-time cyber security awareness training on a display screen of the endpoint device associated with that specific end user, at a time when the behavioral activity by the end user on the endpoint device creates the one or more of i) a model breach indicative of the potential cyber threat, ii) the violation of any of the network policy, the email policy, or the cloud policy, and/or iii) a misconfiguration of any of a setting for a device associated with a cloud network, an email network or an IT network. The authentication module 213 can cooperate with a mapping module 233 and a customized training module 243 to provide the just-in-time cyber security awareness training on the endpoint device associated with that specific end user at the time when the behavioral activity by the end user on the endpoint device triggers a need for the cyber security awareness training, which causes more relevant and better learning for the end user. An endpoint agent, either the client sensor (csensor), the mobile app, or both, resident and running on the endpoint device that is configured to monitor the behavioral activity by the end user occurring on the endpoint device, including emails being received and/or generated by the end user of that endpoint device. The endpoint agent can continuously report the behavioral activity by the end user on that endpoint device through a secure communication channel to a cyber security appliance 100 protecting a network, such as a cloud network, an email network, or an IT network. The cyber security appliance 100 is configured to protect the network that is used by the end user from potential cyber threats. The endpoint agent can report those activities in a condensed format in near real time/at that moment in the secure communication channel to the security appliance protecting that network from potential cyber threats. The recognition module 223 in the security awareness training system 203 cooperates with other modules in the cyber security appliance to monitor the activities and other behavior of the end user on the endpoint device and cooperates with the authentication module 213 when security awareness training is needed.

Figure 2:
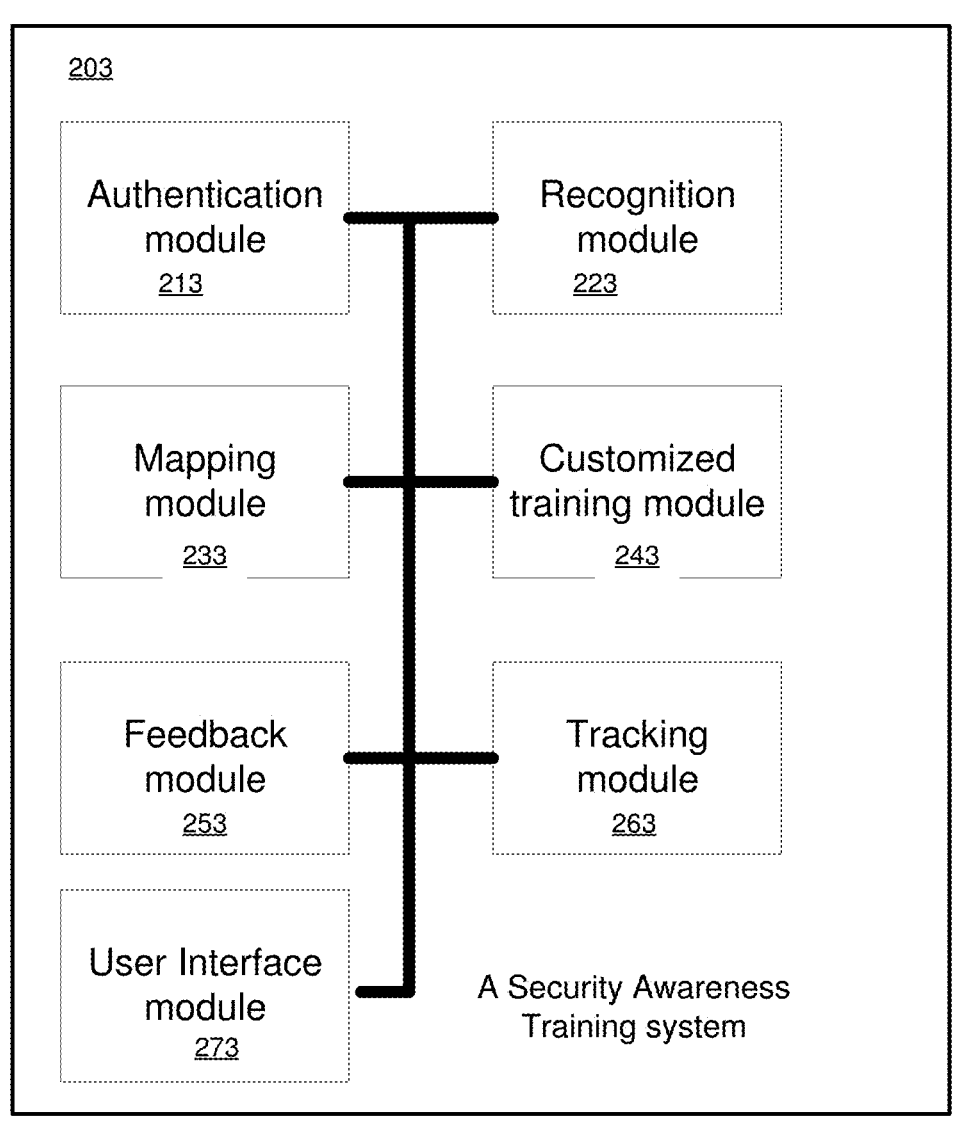
FIG. 2 illustrates a block diagram of an embodiment of the example security awareness training system including a recognition module, an authentication module, a mapping module, a customized training module, a tracking module, a feedback module, and a user interface that cooperate with each other to provide just-in-time cyber security awareness training and other functions.

FIG. 2 illustrates a block diagram of an embodiment of the example security awareness training system including a recognition module, an authentication module, a mapping module, a customized training module, a tracking module, a feedback module, and a user interface that cooperate with each other to provide just-in-time cyber security awareness training and other functions.

The authentication module 213 can provide a secure delivery method for cyber security awareness training on an endpoint device associated with that specific end user. The authentication module 213 can generate a token with a client ID tied to the end user to provide the just-in-time cyber security awareness training on the display screen of the endpoint device and then send a secure link associated with the token with the client ID to an endpoint agent on the end user's endpoint device, which allows the end user to access to the cyber security awareness training when the end user activates the secure link without having to go through supplying the end user's authentication information or log-in details. The authentication module 213 creates an authentication service for all of the end users where they will have to have their own logins matched to their specific token with their client id. The authentication module 213 creates a token that is potentially sent through the cyber security endpoint agent (e.g. csensor and/or mobile app) resident on that particular person's client endpoint device (e.g., laptop, smart phone, etc.) which is unique to that particular person's client device. For example, the authentication module 213 can authenticate end users by including that client id within the JSON Web Token (JWT) (e.g., a token). The authentication module 213 can be a cloud based service that generates the JSON Web Token when it is requested by the recognition module 223. The authentication module 213 then sends a link to the end user through the cyber security endpoint agent resident on that particular person's client device which allows the end user access to the training if they click it, without having to go through supplying their authentication information or log-in details. The authentication module 213 uses a secure delivery mechanism that works through the csensor and/or mobile app resident on the endpoint agent on that end user's device to give the end user access to a tailored training platform on that end user's device, preventing the backend cyber security platform from needing to host any kind of authentication service. Thus, to implement authorization for this, the training system can use a plug in extension, such as AWS lambda edge, to validate the JSON web token (JWT) that has previously been served to the end user to access static resources. The authentication module 213 can implement authentication stages to verify that the JWT is still valid for this time period and that the credentials of the endpoint device (e.g. endpoint device ID and/or email account of that end user) that is accessing this link matches the credentials of the end user that is intended to be accessing this training. The authentication module 213 can store the credentials for every end user in a secure store of end user credentials and cooperate with the endpoint agent on the endpoint device to ensure these credentials match.

The recognition module 223 can detect when behavioral activity by an end user on the endpoint device creates one or more of i) a model breach indicative of a potential cyber threat, ii) a violation of any of a network policy, an email policy, or a cloud policy, and iii) a misconfiguration of a setting for a device associated with any of a cloud network, an email network, or an IT network. A recognition module 223 can work with the various models of the cyber security appliance to detect when the behavioral activity by the end user on the endpoint device creates a model breach indicative of a potential cyber threat, violates any of a network policy, an email policy, and/or instant messaging policy, and/or violates a misconfiguration of a setting for a device associated with any of a cloud network, an email network or an IT network in order to trigger sending the just-in-time security awareness training on that activity and/or application that is currently being used by the end user; as opposed, to some sort of scheduled training. Note, the models in the cyber security appliance can have a set of logical rules to detect and compare to, for example, i) minimum anomaly thresholds and/or ii) specific events occurring in the reported processes and activities of the end user, especially in combinations with other related activities occurring around a similar time frame. Note, the recognition module 223 is customized to the end user in an aspect because the Artificial Intelligence model trained to model a pattern of life specific to that end user, which customizes the detection of when the behavioral activity by the end user on the endpoint device is unusual enough for that end user to trigger the one or more of i) the model breach indicative of the potential cyber threat and/or ii) the violation of the network policy, the email policy, and/or the cloud policy to the end user. Thus, what may be an unusual activity for most end users in the network may be a routine activity for this specific end user; and thus, will not trigger a model breach for this end user by merely engaging in their normal work routine. The recognition module 223 can also actively scan an endpoint device to search for a breach indicative of a potential cyber threat, a violation of a network policy, an email policy, and/or an instant messaging policy, and/or a violation of a misconfiguration of a setting for a device. For example, the recognition module 223 can actively scan the endpoint device to detect a violation of a network policy, such as the end user is storing a text based document with the end user's passwords. In another example, the recognition module 223 can detect an end user plugging a USB device into the endpoint device (e.g. a laptop). In another example, the recognition module 223 can detect the end user attempting to access facebook.com during work hours against network policy. In another example, the recognition module 223 can detect the end user attempting to read an email that the models in the cyber security appliance have decided to be a violation of that model and/or policy, such as had an assigned high anomaly score. The authentication module 213 will then send relevant point-in-time/just-in-time targeted training directly to that end user which would go through the cyber security appliance to the endpoint agent resident on the endpoint device. The link for the training is authenticated specifically for that end user and the training conveys, "Hey, don't do that detected activity that you are currently engaged in doing, adds contextualized information customized to that end user to explain this is why it is wrong, and adds contextualized information customized to that end user to explain this is what you should be doing."

The relevant point-in-time targeted training is different than a generic pop up warning sent to the end user. Instead, the notice to the user has a link to open a web browser or the mobile app resident on that endpoint device which then begins the targeted, customized, just-in-time, cyber security awareness training. Note, the endpoint agent, such as the mobile app or csensor, is generally configured with a limited analysis of potential violations and model breaches and what should be the instantaneous autonomous response actions, by the endpoint agent and/or cyber security appliance, when the severity level of those violations and model breaches is high enough. The endpoint agent is programmed with this knowledge just in case the secure communication channel/ tunnel between the endpoint device and cyber security appliance is disturbed or cut off. The endpoint agent continuously monitors the process data and other end user behavior occurring on the endpoint device. However, the endpoint agent can assist in speeding up the analysis of certain end user behavior by the cyber security appliance; and thus, the recognition module 223 by marking/highlighting that questionable/inappropriate behavior when the activities and behavior is being communicated to the cyber security appliance.

The cyber security appliance ingests and analyzes the process data and other end user behavior occurring on the endpoint device for modeling that the pattern of life and other cyber security reasons but the marking by the endpoint agent can assist in speeding up analysis of certain portions of the supplied the process data and other end user behavior occurring on the endpoint device.

The mapping module 233 can create the just-in-time cyber security awareness training that is targeted and correlated to the behavioral activity by the end user on the endpoint device that created the model breach and/or the violation. The mapping module 233 can cooperate with the recognition module 223 to map i) the detected model breach indicative of the potential cyber threat, ii) the detected violation of the network policy, the email policy, and/or the instant messaging policy, and/or iii) the detected violation of the misconfiguration of a setting for a device, to training scenarios including training content corresponding to the detected type of violation by the end user's behavior. The mapping module 233 cooperates with the customized training module 243 to select the training scenarios and training content mapped to in order to educate the end user on the proper cyber security awareness training and actions that they should take based on this potential problem detected. The mapping module 233 maps the type of trigger to the type of training.

The customized training module 243 has both a static content component on cyber security awareness training as well as a dynamic content component to supplement the cyber security awareness training to customize the just-in-time cyber security awareness training with specific examples from the end user's current and/or previous behavior. The static training from the static content component has pre-generated static training scenarios associated with the detected model breach and/or policy violation. The customized training module 243 uses the dynamic content component to bring in and populate specific examples for that end user that are contextually relevant for the end user based upon that end user's history and current activity that the end user is engaging in. Each model breach and/or policy violation can already have a prepared training scenario on that specific breach and/or violation and why that is bad and what the end user should be doing. Thus, 'N' number of mapped and pre-generated static training scenarios associated with that model breach and/or policy violation are stored and then can be supplemented with the dynamic content customized specific to that end user. The static training has 1) openings and portions in that static training to insert specific dynamic examples customized to that end user that are more relevant to that end user as well as 2) openings/modifications of the training explanations of why this detected activity is bad. The default set of model breaches and/or policy violations mapped to training scenarios can be regularly updated as well as can be supplemented by the security team of the network being protected. Each security team with their network being protected can define their own sets of policies and then select certain sets of training that would be triggered off as a result. The dynamic content component uses machine learning trained to find relevant activities of the end user that the end user is doing and/or has recently performed and modifies what the user should be doing based upon their normal pattern of life and then populates those examples in preset relevant times within the training scenario provided by the static content component. The dynamic content component works directly with the AI model trained with machine learning on a normal pattern of life for this specific end user in the network under analysis; and thus, the customized training module 243 readily knows specifics about the end user such as what department someone is in, what their technical level is, what are their normal devices that work on, what are other normal behaviors of this user, etc.; and thus, this system doesn't require a lot of pre manual configuration about the end user. The relevant point-in-time targeted training is specific to the activity that the end user was currently conducting and that triggered the model breach and/or policy violation. In an embodiment, the targeted training can be used for scheduled training as well and then the end user will also benefit from a lack of a need to log in to the training via the authorization link as well as the training is specifically customized for that end user's normal pattern of life at work (including the end user's department, job title, personal data, the end user's emails, the end user's actual browsing history, etc.) versus some generic training on cyber security that may be mostly irrelevant to that end user. The customized training module 243 uses both static content on cyber security awareness training as well as a dynamic content component to provide the end user with a meaningful training scenario on the endpoint device at the time the end user is engaging in the behavior that is violating the model breach and/or policy violation. The training lessons are customized based upon contextual data that we have about the end user and what the end user does at work as well as customized to the pattern of life of that end user. In an example, the dynamic content component can review the end user's web history to find the browsing data and the website that was flagged as unusual/dangerous and then find and substitute in actual domains that are similar to websites the end user has recently visited and explain in the training why those are bad and relevant to that end user. In the case of a misconfiguration, the recognition module 223 cooperates with the authentication module 213 to provide the just-in-time cyber security awareness training on the display screen of the endpoint device associated with that specific end user to train on a proper configuration for the setting of the device. The authentication module 213 and the customized training module 243 cooperate to actively influence a behavior of the end user on the endpoint device by directly contacting the end user while in the act of performing that activity when the behavioral activity by the end user on the endpoint device triggers the need for the cyber security awareness training. For example, the end user and endpoint device may be working in a geographic location atypical such as working from Panama and that violates a network policy, which triggers the authentication module 213 to send a link to the end user on a display screen of an endpoint device.

When the link from the authentication module 213 is clicked by the end user, at that time, the end user is sent back into the cyber security platform's infrastructure and its content delivery network. Within the security awareness training (SAT) system, the customized training module 243 can store static content in a global s3 bucket/container that is accessed via a cloud based content delivery network, such as AWS CloudFront CDN, for low latency during training sessions. The content delivery system can be implemented in a cloud based infrastructure to store the training and then present that training directly on the display screen of the endpoint device. This has the advantage of caching the customized training data, which rapidly assembles in parallel with a static training scenario supplemented by the dynamic examples of end user behavior so that it is extremely fast to deliver the relevant just-in-time targeted customized training to the user. The dynamic content component already knows the exact email account and end user's credentials being trained and so doing the look up in the data store to find relevant dynamic content to supplement with is a very fast process. The static content in the training scenarios can include videos and step-by-step instructions, which are then supplemented in the appropriate time slots with dynamically generated actual behavior, which was recorded, of that end user. The training inserts and explanations can be generated by a Large Language Model cooperating with the dynamic content component.

A recognition module 223 can detect the breach and/or violation and the customized training module 243 cooperates with the recognition module 223 to point exactly to what the end user has done that breached the policy and then train on what the end user should have done differently. The authentication module 213 and the customized training module 243 cooperate to actively train on real world emails in the email inbox of that end user that could potentially contain a cyber threat that the end user was about to i) read and/or ii) activate a malicious link within and/or iii) send their sensitive financial or personal information to in response to a real world phishing or other scam email and then train the end user on what not to do. The recognition module 223 and mapping module 233 can understand the level of anomaly and potential cyber threat for, in this example cyber threat-malicious email, and actually provide just in time training on this real world scenario, and the advantage of that is, it is always better to learn on something that is relevant to the end user to make the training more effective.

Another advantage of the recognition module 223, customized training module 243, and mapping module 233 cooperating is that the customized training module 243 can understand the level of anomaly and potential cyber threat is then the triggered targeted training is specific to that threat making the entire training sessions relatively short and better tolerated by the end users of the network.

The authentication module 213 is configured to cooperate with the customized training module 243 to allow contextual relevant training based upon real-world examples of behavior of the end user to be deployed directly to the end user on their endpoint device without requiring the end user to log into an entirely separate platform to host and engage in the just-in-time cyber security awareness training. The authentication module 213 of the security awareness training system 203 via the cyber security appliance's secure tunnel with an endpoint agent (csensor and/or mobile app) resident on an endpoint device provides a secure delivery method where the system can send to each end user a tailored link or access to a tailored environment where the end user gets this training, that is specific to them without them having to log into a platform because the token with the specific id does not require us to do. The recognition module 223 monitors the cyber security appliance to detect when the various models of the cyber security appliance detect when the behavioral activity by the end user on the endpoint device creates a model breach indicative of a potential cyber threat, violates any of a network policy, an email policy, and/or instant messaging policy, and/or violates a misconfiguration of a setting for a device associated with any of a cloud network, an email network or an IT network in order to trigger sending just-in-time security awareness training on that activity and/or application that is currently being used by the end user. The authentication module 213 then sends the authorized link to the end user with the appropriate and relevant security awareness training to the detected model breach, policy violation, and/or settings misconfiguration without the end user needing to login to gain access to that training. In an embodiment, the authentication module 213 of the security awareness training system 203 via the cyber security appliance can send an authenticated link, e.g. URL, to the appropriate endpoint device via the 1) client sensor (csensor) and/or 2) mobile app resident in the client endpoint device that opens in a browser-based app and prompts the end user into starting as well as completing the training.

Again, this approach will allow us to authenticate users by including a client id within the JWT (e.g., a token), which will then allow us to restrict and tailor the content to a particular end user who is the only person that has access to their client endpoint device. The training environment and the content being trained on are specific and customized to that end user, based upon using that token and then further customized based upon the end user's current activity and/or behavior triggering the recognition module 223 and supplemented with specific examples from the end user's current or previous behavior. The training environment on security awareness is customized to that customer's particular network (including the system software that operates on this particular end user's device, etc.) and then data from that end user's particular modeled pattern of life, which makes the security awareness much more relevant to the end user being trained on security awareness. The customized training module 243 can directly train people off the back of identified cyber security threats or interactions with malicious actors, and then feed their interactions back into one's detections. The authentication module 213 and the customized training module 243 utilize amassed contextual and behavioral data about the end user to target relevant security awareness training on either a just-in-time, a regularly scheduled approach deployed directly to the end user on their endpoint device that is based upon real examples of their interactions within this contextualized training that draws upon historic behavior, for example, browsing data email interactions, actions performed on SaaS platforms, and other working environments to explain why the end user's interactions and other behaviors were in violation of i) a network policy, email policy, cloud policy, and/or breach of a model indicative of a cyber threat and the system should generate the customization of a number of training templates that can be populated with end user customization relevant data automatically that allows the system to deliver this contextualized training in a way and at a time that remains relevant to the end user. Thus, the notice and corresponding just-in-time cyber security awareness training is generally supplied within two minutes of the behavioral activity by the end user on the endpoint device being detected and triggering the need for the cyber security awareness training. Within this time window, the actions of the user are still fresh in the mind of the end user and the training will be more effective. In an embodiment, the notice and corresponding just-in-time cyber security awareness training is supplied in less than 30 seconds of the behavioral activity by the end user on the endpoint device being detected and triggering the need for the cyber security awareness training.

A tracking module 263 can monitor active emerging cyber threats by monitoring third party websites and services regarding emerging threats, and then map those emerging cyber threats to be relevant to the normal activities engaged in by that end user; and thus, make a nexus that this particular end user may be especially at risk to the emerging threat, whom is then notified of this emerging cyber threat and behavior to avoid in light of the emerging cyber threat. The tracking module 263 can also track the initial and completion state by each end user of the just-in-time cyber security awareness training and whether this particular end user is repeatedly trained on similar cyber security issues. The tracking module 263 is configured to work with the customized training module 243 to alter the just-in-time cyber security awareness training when the end user repeatedly violates a same policy and/or model breach. The tracking module 263 can cooperate with the feedback module 253 to send the notice to the organization's cyber security team regarding the end user. The tracking module 263 can track and store the data on, for example, is the end user engaging with the provided training scenario, which questions has the end user answered, and did the end user provide the correct answer to the question? How long did the end user watch the customized training scenario? The tracking module 263 encourages end users to think about cyber security awareness, and to learn to not repeat the same cyber security mistakes by notifying both the end user and the cyber security team of repeated violations of the same policy and/or the behavior that triggers the recognition module 223. The tracking module 263 can work with the customized training module 243 to alter the training when an end user repeatedly violates a same policy and/or model breach. For example, the customized training module 243 may prepare and send a training session with multiple lessons. A first lesson of a first training session was a bit of an introduction to password managers, and why they are useful and why it is bad to store passwords in an unprotected text based document. The second lesson of a second training session is a more in-depth look at exactly how easily a cyber threat attacker could exploit plain text password saved on the end user's system and then how easily once that end user is compromised how much easier it is to compromise another end user in the protected system, in order to get the end user to understand the level of risk the end user is incurring by violating this network policy.

A feedback module 253 from the security training system can supply feedback to various components inside the cyber security system, including the cyber security appliance and its models for detecting a potential cyber threat, based upon a risk associated with this end user and their reactions to the cyber security awareness training. The feedback from the end user's training can either raise or lower the score levels associated with those model breach thresholds to trigger a breach based upon what the feedback module 253 deduces the end user has learned and/or not learned in training and whether the end user keeps on repeating this problem. The feedback module 253 feeds into the pipeline of models and how the various risk scores are calculated as well as how the threshold values to breach models and policy violations are set. The feedback module 253 can also work with the cyberattack simulator to affect attack path modeling risk scores and how easy it would be for a potential cyber threat to breach and compromise the network based upon this particular user's training and feedback on their training. The feedback module 253 can also work with the tracking module 263 to determine whether the end user is or is not interacting with the training at all and based on the end user's answers if the end user has learned from their training. The feedback module 253 can also work with the cyberattack restoration engine to affect attack path modeling restoration scores and restoration of permissions back to an end user. The feedback module 253 can also have a connection to the autonomous response module in the endpoint agent on the level of severity of actions to take such as taking away permissions or shutting down certain activities based upon whether the training was successful and completed and whether repeat training needs to be performed on this specific end user. The feedback module 253 can also cooperate with the autonomous response engine 140 in the cyber security appliance on the level of severity of actions to take such as taking away permissions or shutting down certain activities based upon whether the training was successful and completed and whether repeat training needs to be performed on this specific end user. The feedback module 253 can also send a notice to the organization's cyber security team when the end user is not responsive or does not properly respond to the just-in-time training so that maybe the end user needs some more specialized training.

Again, the feedback module 253 cooperating with the tracking module 263 supplies the results of the training to various components in the cyber security system. How the end user interacts with the end device and the network in general. How regularly the end user was required to follow through the training. The feedback module 253 uses all these factors to feed them back into the wider cyber security system to influence the computation of risky behaviors and influence the recovery process during a cyber security incident and fed back to influence the production of more training.

Note, the endpoint agent resident on the endpoint device has both i) monitoring and reporting capabilities built into that endpoint agent but equally important autonomous response capabilities to stop an authorized action such as sending an email, removing end user permissions, restricting the end user to only being able to take actions that fall within their normal pattern of life, etc. The information reported by the endpoint agent is reported to the cyber security appliance via the secure communications tunnel between them and then between the cyber security appliance and the cyber security cloud platform via the secure communications tunnel between those two components. However, the endpoint agent resident on the endpoint device has enough intelligence to send end user behavior marked/highlighted as a violation of a policy and/or a model breach, to create a temporary secure communications tunnel with the security awareness training system 203 in the cyber security cloud platform, and then send the end user behavior marked/highlighted as a violation of a policy and/or model breach directly to the security awareness training system 203 in the cyber security cloud platform. The endpoint agent resident on the endpoint device is also configured to ensure the link for training, which is supposed to be delivered from the secure communications tunnel from the cyber security appliance, is actually coming from the cyber security appliance and not another source.

A user interface module 273 can allow the cyber security team to make alterations to default settings for the security awareness training system 203. For example, certain members of their executive team must receive the security team's approval prior to receiving one of these pop up notifications on their laptop. Likewise, all members of a particular department, especially brand new employees in that department, should not receive training notices for activities performed often in that department, independent of whether the model patterning the normal life of that end user has established that this particular end user regularly engages in that activity. Likewise, when an end user notifies the cyber security team that they will be leaving their typical geographical area for another location, then the cyber security team can disable the training module for violations for policy violations for trying to access the corporate network with the endpoint device from that new geographic area. The user interface module 273 provides options to exclude this group of end users or this individual end user from this type of training.

Additional Details

The following text below discusses how some of the other components in the cyber security system operate; and thus, how these components respond to the commands, requests, and communications from the security awareness training system 203.

Figure 4:
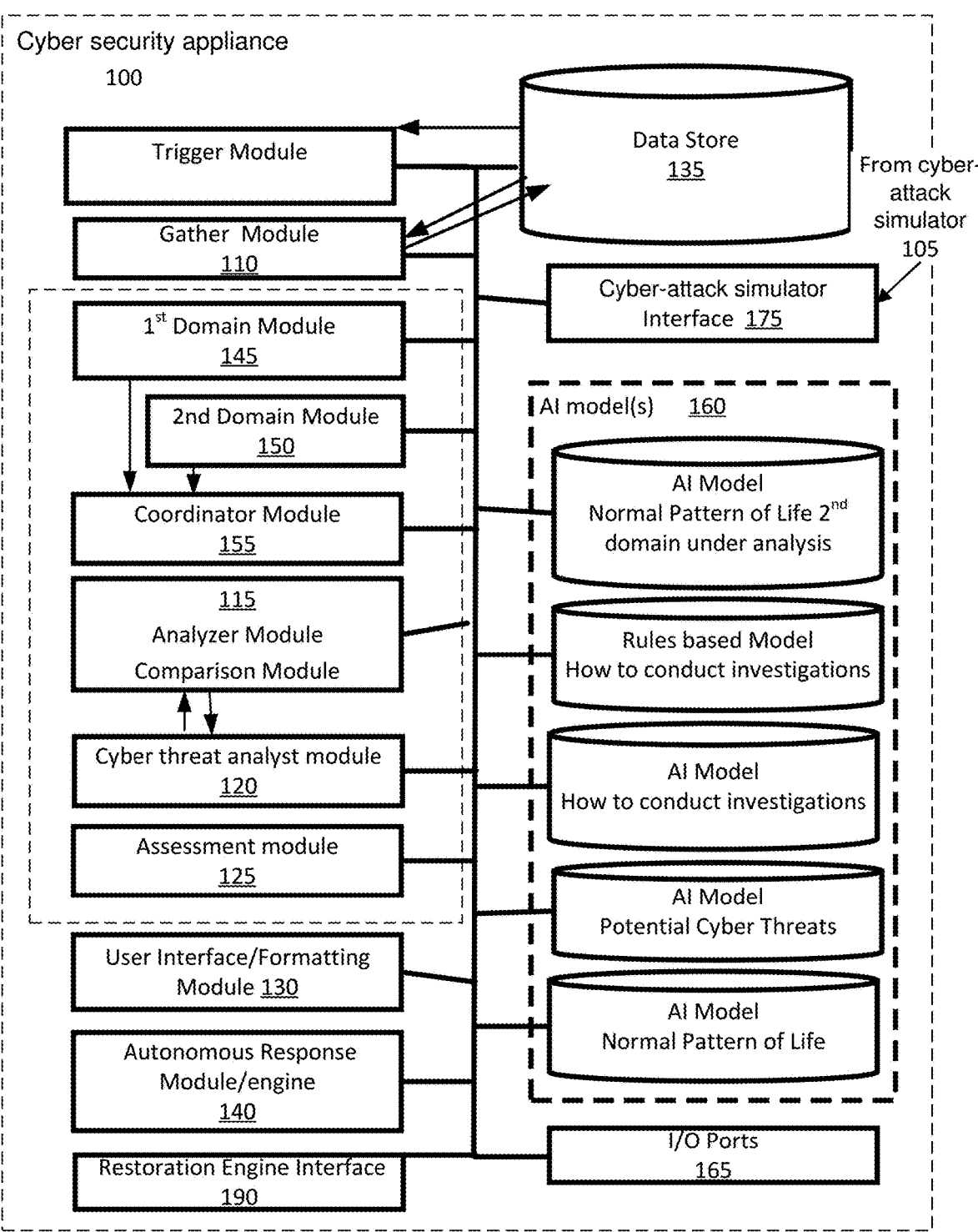
FIG. 4 illustrates a block diagram of an embodiment of the AI-based cyber security appliance with example components making up a detection engine that protects a system, including but not limited to a network/domain, from cyber threats.

FIG. 4 illustrates a block diagram of an embodiment of the AI-based cyber security appliance with example components making up a detection engine that protects a system, including but not limited to a network/domain, from cyber threats. Various Artificial Intelligence models and modules of the cyber security appliance 100 cooperate to protect a system, such as one or more networks/domains under analysis, from cyber threats. In an embodiment, the AI-based cyber security appliance 100 may include a trigger module, a gather module 110, an analyzer module 115, a cyber threat analyst module 120, an assessment module 125, a user interface and formatting module 130, a data store 135, an autonomous response engine 140 and/or an interface to an autonomous response engine 140, an Information Technology network domain module 145, an email domain module

150, and a coordinator module 155, one or more AI models 160 (hereinafter, AI model(s)"), and/or other modules. The AI model(s) 160 may be trained i) with machine learning on a normal pattern of life for entities in the network(s)/domain(s) under analysis, ii) with machine learning on cyber threat hypotheses to form and investigate a cyber threat, iii) on what are a possible set of cyber threats and their characteristics, symptoms, remediations, etc., an interface to a restoration engine 190, an interface to a cyber-attack simulator 105, and other similar components.

The cyber security appliance 100 can host the cyber threat detection engine and other components. The cyber security appliance 100 includes a set of modules cooperating with one or more Artificial Intelligence models configured to perform a machine-learned task of detecting a cyber threat incident. The detection engine uses the set of modules cooperating with the one or more Artificial Intelligence models in the cyber security appliance 100 to prevent a cyber threat from compromising the nodes (e.g. devices, end users, etc.) and/or spreading through the nodes of the network being protected by the cyber security appliance 100.

The cyber security appliance 100 with the Artificial Intelligence (AI)-based cyber security system may protect a network/domain from a cyber threat (insider attack, malicious files, malicious emails, etc.). The cyber security appliance 100 can protect all of the devices on the network(s)/domain(s) being monitored. For example, the IT network domain module (e.g., first domain module 145) may communicate with network sensors to monitor network traffic going to and from the computing devices on the network as well as receive secure communications from software agents embedded in host computing devices/containers. Other domain modules such as the email domain module 150 and a cloud domain module operate similarly with their domain. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store 135. In addition, a feature classifier can examine and determine features in the data being analyzed into different categories.

The analyzer module 115 can cooperate with the AI model(s) 160 or other modules in the cyber security appliance 100 to confirm a presence of a cyber threat in cyber-attack against one or more domains in an enterprise's system (e.g., see system/enterprise network 791, 792, and 747 of FIG. 6). A process identifier in the analyzer module 115 can cooperate with the gather module 110 to collect any additional data and metrics to support a possible cyber threat hypothesis. Similarly, the cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. The analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats.

The cyber threat analyst module 120 allows two levels of investigations of a cyber threat that may suggest a potential impending cyberattack. In a first level of investigation, the analyzer module 115 and AI model(s) 160 can rapidly detect and then the autonomous response engine 140 will autonomously respond to overt and obvious cyberattacks (generally indicated by high scores of 80 or more see FIG. 3). However, thousands to millions of low level anomalies occur in a domain under analysis all of the time; and thus, most other systems need to set the threshold of trying to detect a cyberattack by a cyber threat at level higher such as a score of 80 or more than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grâce/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies combined in with other anomalies and factors as a part of a chain of linked information (See FIG. 3).

Figure 3:
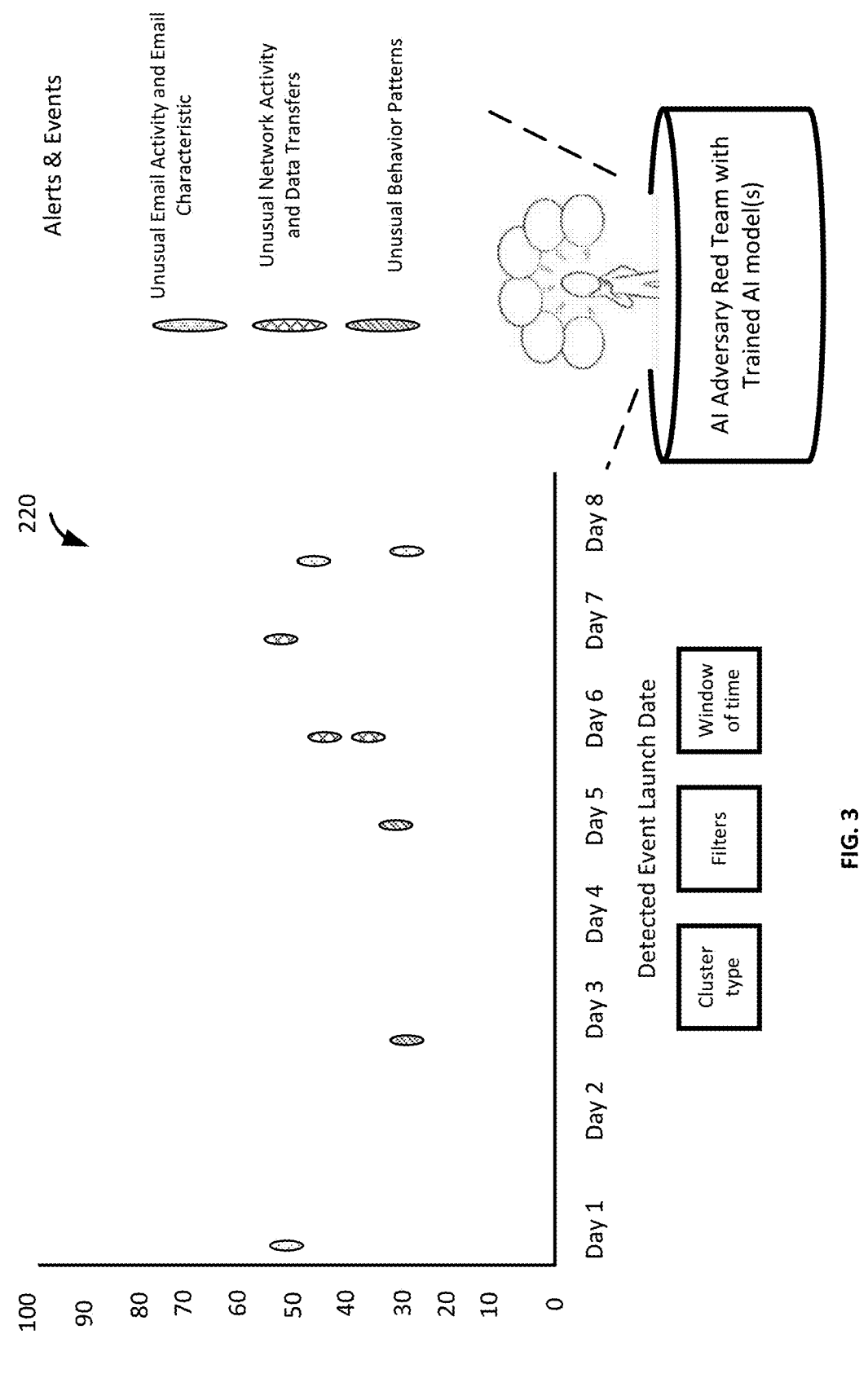
FIG. 3 illustrates a graph of an embodiment of an example chain of unusual behavior for, in this example, the email activities and IT network activities deviating from a normal pattern of life in connection with the rest of the system/network under analysis.

The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system. For example, as shown in FIG. 3, the cyber threat analyst module 120 may perform several additional rounds 220 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is then needed to further investigate the anomaly (and/or anomalies) of interest included in the chain of potentially related information.

Returning back to FIG. 4, an input from the cyber threat analyst module 120 of a supported hypothesis of a potential cyber threat will trigger the analyzer module 115 and/or assessment module 125 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most cyber threat hypotheses are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering will build chains of linked low-level indicators of unusual activity along with potential activities that could be within a normal pattern of life for that entity to evaluate the whole chain of activities to support or refute each potential cyber threat hypothesis formed. (See again, for example, FIG. 3 and a chain of linked low-level indicators, including abnormal behavior compared to the normal pattern of life for that entity, all under a score of 50 on a threat indicator score). The investigations by the cyber threat analyst module 120 can happen over a relatively long period of time (e.g. a week or longer) and be far more in depth than the analyzer module 115 which will work with the other modules and AI model(s) 160 to confirm that a cyber threat has in fact been detected by the presence of an anomaly with a score of 75 or more and/or the occurrence of a specific event deemed a serious cyber threat in itself occurring.

The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat and generally that presence of an anomaly with a high threat/anomaly score and/or the occurrence of a specific event deemed a serious cyber threat in itself, will cause the analyzer module 115 to send a signal and this information to the autonomous response engine 140. Again, the analyzer module 115 can cooperate with the AI model(s) 160 and/or other modules to rapidly detect and then cooperate with the autonomous response engine 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 trained on a normal pattern of life for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module to trigger an investigation to start the formation of one or more hypotheses on what are a possible set of cyber threats that could include the initially identified abnormal behavior and/or suspicious activity.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicate a level of severity of the cyber threat.

Each Artificial Intelligence-based engine has an interface to communicate with another separate Artificial Intelligence-based engine, which is configured to understand a type of information and communication that this other separate Artificial Intelligence-based engine needs to make determinations on an ongoing cyberattack from that other Artificial Intelligence-based engine's perspective. The autonomous response engine 140 works with the assessment module 125 in the detection engine when the cyber threat is detected and autonomously takes one or more actions to mitigate the cyber threat. FIG. 4 shows the example components making up the detection engine to include interfaces to the cyber-attack simulator 105, the autonomous response engine 140, and the restoration engine 190.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

FIG. 5 illustrates a diagram of an embodiment of i) the cyber threat detection engine 100 using Artificial Intelligence algorithms trained to perform a first machine-learned task of detecting the cyber threat, ii) an autonomous response engine 140 using Artificial Intelligence algorithms trained to perform a second machine-learned task of taking one or more mitigation actions to mitigate the cyber threat, iii) a cyber-security restoration engine 190 using Artificial Intelligence algorithms trained to perform a third machine-learned task of remediating the system being protected back to a trusted operational state, and iv) a cyber-attack simulator 105 using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together. In addition, the intelligent orchestration component can use Artificial Intelligence algorithms trained to perform a fifth machine-learned task of adaptive interactive response between the multiple Artificial Intelligence-based engines to provide information each Artificial Intelligence engine needs to work cohesively to provide an overall incidence response that mitigates different types of cyber threats while still minimizing an impact tailored to this particular system being protected. For example, when a conversation occurs between the AI-based engines such as a system that can be positively affected by both proposed mitigation actions and proposed restoration actions, any of which might be attempted but fail or only partially succeed, then the intelligent orchestration component can arbitrate and evolve the best result for this particular system being protected. The intelligent orchestration component can help anticipate i) the needs of and ii) cohesive response of each Artificial Intelligence-based engine based on a current detected cyber threat.

Referring to FIG. 5, the cyber security restoration engine 190 is configured to take one or more remediation actions with Artificial Intelligence assistance to remediate the one or more nodes in the graph of the system affected by the cyberattack back to a trusted operational state in a recovery from the cyber threat. These actions might be fully automatic, or require a specific human confirmation decision before they begin. The cyber security restoration engine 190 can cooperate with the other AI-based engines of the cyber security system, via the interfaces and/or direct integrations, to track and understand the cyber threat identified by the other components as well as track the one or more mitigation actions taken to mitigate the cyber threat during the cyberattack by the other components in order to assist in intelligently restoring the protected system while still mitigating the cyber threat attack back to a trusted operational state; and thus, as a situation develops with an ongoing cyberattack, the cyber security restoration engine 190 is configured to take one or more remediation actions to remediate (e.g. restore) at least one of the nodes in the graph of the network back to a trusted operational state while the cyberattack is still ongoing.

The example multiple Artificial Intelligence-based engines cooperating with each other can include i) the cyber threat detection engine, ii) an autonomous response engine 140, iii) a cyber-security restoration engine 190, and iv) a cyber-attack simulator 105. i) The cyber threat detection engine (consisting of the modules making up the cyber security appliance 100) can be configured to use Artificial Intelligence algorithms trained to perform a machine-learned task of detecting the cyber threat. (See for example FIG. 4) ii) The autonomous response engine 140 can be configured to use Artificial Intelligence algorithms trained to perform a machine-learned task of taking one or more mitigation actions to mitigate, including stopping, the cyber threat. iii) The cyber-security restoration engine 190 can be configured to use Artificial Intelligence algorithms trained to perform a machine-learned task of remediating the system being protected back to a trusted operational state. iv) The cyber-attack simulator 105 can be configured to use Artificial Intelligence algorithms trained to perform a machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. (See, for example, FIG. 6)

The multiple Artificial Intelligence-based engines have communication hooks in between them to exchange a significant amount of behavioral metrics including data between the multiple Artificial Intelligence-based engines to work in together to provide an overall cyber threat response.

The intelligent orchestration component can be configured as a discreet intelligent orchestration component that exists on top of the multiple Artificial Intelligence-based engines to orchestrate the overall cyber threat response and an interaction between the multiple Artificial Intelligence-based engines, each configured to perform its own machine-learned task. Alternatively, the intelligent orchestration component can be configured as a distributed collaboration with a portion of the intelligent orchestration component implemented in each of the multiple Artificial Intelligence-based engines to orchestrate the overall cyber threat response and an interaction between the multiple Artificial Intelligence-based engines. In an embodiment, whether implemented as a distributed portion on each AI engine or a discrete AI engine itself, the intelligent orchestration component can use self-learning algorithms to learn how to best assist the orchestration of the interaction between itself and the other AI engines, which also implement self-learning algorithms themselves to perform their individual machine-learned tasks better.

The multiple Artificial Intelligence-based engines can be configured to cooperate to combine an understanding of normal operations of the nodes, an understanding emerging cyber threats, an ability to contain those emerging cyber threats, and a restoration of the nodes of the system to heal the system with an adaptive feedback between the multiple Artificial Intelligence-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information.

The multiple Artificial Intelligence-based engines each have an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective. Each Artificial Intelligence-based engine has an instant messaging system to communicate with a human cyber-security team to keep the human cyber-security team informed on actions autonomously taken and actions needing human approval as well as generate reports for the human cyber-security team.

Each of these Artificial Intelligence-based engines has bi-directional communications, including the exchange of raw data, with each other as well as with software agents resident in physical and/or virtual devices making up the system being protected as well as bi-directional communications with sensors within the system being protected. Note, the system under protection can be, for example, an IT network, an OT network, a Cloud network, an email network, a source code database, an endpoint device, etc.

In an example, the autonomous response engine 140 uses its intelligence to cooperate with a cyber-attack simulator and its Artificial Intelligence-based simulations to choose and initiate an initial set of one or more mitigation actions indicated as a preferred targeted initial response to the detected cyber threat by autonomously initiating those mitigation actions to defend against the detected cyber threat, rather than a human taking an action. The autonomous response engine 140, rather than the human taking the action, is configured to autonomously cause the one or more mitigation actions to be taken to contain the cyber threat when a threat risk parameter from an assessment module in the detection engine is equal to or above an actionable threshold. Example mitigation actions can include 1) the autonomous response engine 140 monitoring and sending signals to a potentially compromised node to restrict communications of the potentially compromised node to merely normal recipients and types of communications according to the Artificial Intelligence model trained to model the normal pattern of life for each node in the protected system, 2) the autonomous response engine 140 trained on how to isolate a compromised node as well as to take mitigation acts with other nodes that have a direct nexus to the compromised node.

In another example, the cyber-attack simulator 105 and its Artificial Intelligence-based simulations use intelligence to cooperate with the cyber-security restoration engine 190 to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state.

In another example, the cyber security restoration engine 190 restores the one or more nodes in the protected system by cooperating with at least two or more of 1) an Artificial Intelligence model trained to model a normal pattern of life for each node in the protected system, 2) an Artificial Intelligence model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response engine 140.

FIG. 6 illustrates a block diagram of an embodiment of the cyber-attack simulator with Artificial Intelligence-based simulations conducted in the cyber-attack simulator by constructing a graph of nodes of the system being protected (e.g. a network) including i) the physical devices connecting to the network, any virtualized instances of the network, user accounts in the network, email accounts in the network, etc. as well as ii) connections and pathways through the network to create a virtualized instance of the network to be tested. As shown in FIG. 6, the various cooperating modules residing in the cyber-attack simulator 105 may include, but are not limited to, a collections module 705, a cyberattack generator (e.g. phishing email generator with a paraphrasing engine) 702, an email module 715, a network module 720, an analyzer module 725, a payloads module 730 with first and second payloads, a communication module 735, a training module 740, a simulated attack module 750, a cleanup module 755, a scenario module 760, a user interface 765, a reporting module, a formatting module, an orchestration module, an AI classifier with a list of specified classifiers.

The cyber-attack simulator 105 may be implemented via i) a simulator to model the system being protected and/or ii) a clone creator to spin up a virtual network and create a virtual clone of the system being protected configured to pentest one or more defenses provided by scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 100. The cyber-attack simulator 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. The cyber-attack simulator 105 may use the trained AI models to cooperate with one or more AI classifier(s) by producing a list of specific organization-based classifiers for the AI classifier. The cyber-attack simulator 105 is further configured to calculate,-based at least in part on the results of the one or more hypothetical simulations of a possible cyberattack path and/or of an actual ongoing cyberattack paths from a cyber threat determine a risk score for each node (e.g. each device, user account, etc.), the threat risk score being indicative of a possible severity of the compromise prior to an autonomous response action is taken in response to the actual cyberattack of the cyber incident. See for example FIGS. 7A and 7B.

FIG. 7A illustrates a diagram of an embodiment of the cyber-attack simulator and its Artificial Intelligence-based simulations constructing an example graph of nodes in an example network and simulating how the cyberattack path might likely progress in the future tailored with an innate understanding of a normal behavior of the nodes in the system being protected and a current operational state of each node in the graph of the protected system during simulations of cyberattacks. The cyber-attack simulator 105 plots the attack path through the nodes and estimated times to reach critical nodes in the network. The cyberattack simulation modeling is run to identify the routes, difficulty, and time periods from certain entry notes to certain key servers.

Again, similarly named components in each Artificial Intelligence-based engine can 1) perform similar functions and/or 2) have a communication link from that component located in one of the Artificial Intelligence-based engines and then information is needed from that component is communicated to another Artificial Intelligence-based engine that through the interface to that Artificial Intelligence-based engine.

FIG. 7B illustrates a diagram of an embodiment of the cyber-attack simulator and/or the cyber-attack restoration engine assigning scores for a portion of the graph of nodes of the system being protected (e.g. a network) including i) the physical devices, accounts, etc. in the system, etc. as well as ii) connections and attack pathways through the network.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence model (e.g. neural network, decision tree, etc.) can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI models 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/ network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. What is the normal behavior of each entity within that system can be established either prior to the deployment and then adjusted during deployment or alternatively the model can simply be placed into an observation mode for an initial week or two when first deployed on a network/domain in order to establish an initial normal behavior for entities in the network/ domain under analysis. During the deployment of the model, what is considered normal behavior will change as each different entity's behavior changes and will be reflected through the use of unsupervised learning in the model such as various Bayesian techniques, clustering, etc. Again, the AI models 160 can be implemented with various mechanisms, such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst.

At its core, the self-learning AI models 160 that model the normal behavior (e.g. a normal pattern of life) of entities in the network mathematically characterizes what constitutes 'normal' behavior, based on the analysis of a large number of different measures of a device's network behavior-packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models 160 trained on forming and investigating hypotheses on what are a possible set of cyber threats can be trained initially with supervised learning. Thus, these AI models 160 can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed. Next, these cyber threats can include, for example: Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module 125 and/or cyber threat analyst module 120 of FIG. 4 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts and notifications to the enterprise security administrator in a rigorous manner, and prioritize those which most urgently require action. Meanwhile, it also assists to avoid the problem of numerous false positives associated with simply a rule-based approach.

More on the Operation of the Cyber Security Appliance

As discussed in more detail below, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection fingerprints.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous/unusual. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated can the modules cooperating with the AI model of normal behavior can say with high confidence whether a data point is an anomaly or not. Anomaly detection can discover unusual data points in your dataset.

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on steps to take in supporting or refuting hypotheses. The AI models trained on forming and investigating hypotheses are updated with unsupervised machine learning algorithms when correctly supporting or refuting the hypotheses including what additional collected data proved to be the most useful.

Additional Module Interactions

Referring back to FIG. 4, the gather module 110 cooperates with the data store 135. The data store 135 stores comprehensive logs for network traffic observed, email activity, cloud activity, etc. each domain can store their long term data storage in the data store. These logs can be filtered with complex logical queries and each, for example, IP packet can be interrogated on a vast number of metrics in the network information stored in the data store. The gather module 110 pulls data relevant for each possible hypothesis from the data store as well as from additional external and internal sources. In an example, the data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The gather module 110 may have a process identifier classifier. The process identifier classifier can identify and track each process and device in the network, under analysis, making communication connections. The data store 135 cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the domains under analysis may be collected and compared. Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these.

A domain module is constructed and coded to interact with and understand a specific domain. For instance, the IT network domain module 145 may receive information from and send information to, in this example, IT network-based sensors (i.e., probes, taps, etc.). The IT network domain module 145 also has algorithms and components configured to understand, in this example, IT network parameters, IT network protocols, IT network activity, and other IT network characteristics of the network under analysis. The second domain module 150 is, in this example, an email module. The email domain module 150 can receive information from and send information to, in this example, email-based sensors (i.e., probes, taps, etc.). The email domain module 150 also has algorithms and components configured to understand, in this example, email parameters, email protocols and formats, email activity, and other email characteristics of the network under analysis. Additional domain modules, such as a cloud domain module can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

As discussed, the process identifier classifier in the gather module 110 can cooperate with additional classifiers in each of the domain modules 145/150 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses. A feedback loop of cooperation exists between the gather module 110, the analyzer module 115, the domain specific modules such as the IT network module and/or email module, the AI model(s) 160 trained on different aspects of this process, and the cyber threat analyst module 120 to gather information to determine whether a cyber threat is potentially attacking the networks/domains under analysis.

Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI model(s) 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors, including anomalies that include unusual and suspicious behavior, and other indicators of processes and events, are examined by the one or more AI models 160 trained on potential cyber threats including some supporting AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI model(s) 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analyzer module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at. A deeper analysis may assist in confirming an analysis to determine that indeed a cyber threat has been detected. The analyzer module 115 can also look at factors of how rare the endpoint connection is, how old the endpoint is, where geographically the endpoint is located, how a security certificate associated with a communication is verified only by an endpoint device or by an external 3rd party, just to name a few additional factors. The analyzer module 115 (and similarly the cyber threat analyst module 120) can then assign weighting given to these factors in the machine learning that can be supervised based on how strongly that characteristic has been found to match up to actual malicious cyber threats learned in the training.

In another example, an AI classifier supporting the AI models 160 is trained to find potentially malicious indicators. The agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models 160 trained with machine learning on the normal behavior of the pattern of life of the system.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

The cyber threat analyst module using AI models, scripts and/or rules-based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioural pattern analysis of what are the unusual behaviours of the network/system/device/user under analysis by the machine learning models may be as follows. The coordinator module can tie the alerts, activities, and events from, in this example, the email domain to the alerts, activities, and events from the IT network domain. FIG. 3 illustrates a graph 220 of an embodiment of an example chain of unusual behaviour for, in this example, the email activities and IT network activities deviating from a normal pattern of life in connection with the rest of the system/network under analysis. The cyber threat analyst module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behaviour of a malicious actor-human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. The cyber threat analyst module can put data and entities into 1) a directed graph and nodes in that graph that are overlapping or close in distance have a good possibility of being related in some manner, 2) a vector diagram, 3) a relational database, and 4) other relational techniques that will at least be examined to assist in creating the chain of related activity connected by causal links, such as similar time, similar entity and/or type of entity involved, similar activity, etc., under analysis. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviours under analysis, that are equal to or above a configurable level of threat posed by this malicious actor. The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

The autonomous response engine 140 of the cyber security system is configured to take one or more autonomous mitigation actions to mitigate the cyber threat during the cyberattack by the cyber threat. The autonomous response engine 140 is configured to reference an Artificial Intelligence model trained to track a normal pattern of life for each node of the protected system to perform an autonomous act of restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine 190 can operate and function similar to as described for the detection engine.

An assessment of the Cyber Threat in Order to Determine Appropriate Autonomous Actions, for Example, Those by the Autonomous Response Engine In the next step, the analyzer module 115 and/or cyber threat analyst module 120 generates one or more supported possible cyber threat hypotheses from the possible set of cyber threat hypotheses. The analyzer module generates the supporting data and details of why each individual hypothesis is supported or not. The analyzer module can also generate one or more possible cyber threat hypotheses and the supporting data and details of why they were refuted.

In general, the analyzer module 115 cooperates with the following three sources. The analyzer module 115 cooperates with the AI models trained on cyber threats to determine whether an anomaly such as the abnormal behavior and/or suspicious activity is either 1) malicious or 2) benign when the potential cyber threat under analysis is previously unknown to the cyber security appliance 100. The analyzer module cooperates with the AI models trained on a normal behavior of entities in the network under analysis. The analyzer module cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, an assessment module with the AI classifiers is configured to cooperate with the analyzer module. The analyzer module supplies the identity of the supported possible cyber threat hypotheses from the possible set of cyber threat hypotheses to the assessment module. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order to assign a numerical assessment of a given cyber threat hypothesis that was found likely to be supported by the analyzer module with the one or more data analysis processes, via the abnormal behavior, the suspicious activity, or the collection of system data points. The assessment module with the AI classifiers output can be a score (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyzer module, which includes the abnormal behavior or suspicious activity as well as one or more of the collection of system data points, with the one or more AI models trained on possible cyber threats.

The cyber threat analyst module 120 in the AI-based cyber security appliance 100 component provides an advantage over competitors' products as it reduces the time taken for cybersecurity investigations, provides an alternative to manpower for small organizations and improves detection (and remediation) capabilities within the cyber security platform.

The AI-based cyber threat analyst module 120 performs its own computation of threat and identifies interesting network events with one or more processers. These methods of detection and identification of threat all add to the above capabilities that make the AI-based cyber threat analyst module a desirable part of the cyber security appliance 100. The AI-based cyber threat analyst module 120 offers a method of prioritizing which is not just a summary or highest score alert of an event evaluated by itself equals the most bad, and prevents more complex attacks being missed because their composite parts/individual threats only produced low-level alerts.

The AI classifiers can be part of the assessment component, which scores the outputs of the analyzer module. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module can generate an output such as a printed or electronic report with the relevant data. The formatting module can cooperate with both the analyzer module, the cyber threat analyst module, and the assessment module depending on what the user wants to be reported.

The formatting module is configured to format, present a rank for, and output one or more detected cyber threats from the analyzer module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three. The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyzer module, then cooperates with the autonomous response engine 140 to take an autonomous action such as i) deny access in or out of the device or the network and/or ii) shutdown activities involving a detected malicious agent.

The autonomous response engine 140, rather than a human taking an action, can be configured to cause one or more rapid autonomous mitigation actions to be taken to counter the cyber threat. A user interface for the response engine can program the autonomous response engine 140 i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine 140 will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine 140 uses one or more Artificial Intelligence models that are configured to intelligently work with other third-party defense systems in that customer's network against threats. The autonomous response engine 140 can send its own protocol commands to devices and/or take actions on its own. In addition, the autonomous response engine 140 uses the one or more Artificial Intelligence models to orchestrate with other third-party defense systems to create a unified defense response against a detected threat within or external to that customer's network. The autonomous response engine 140 can be an autonomous self-learning response coordinator that is trained specifically to control and reconfigure the actions of traditional legacy computer defenses (e.g., firewalls, switches, proxy servers, etc.) to contain threats propagated by, or enabled by, networks and the internet. The cyber threat module can cooperate with the autonomous response engine 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

The autonomous response engine 140 is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g., devices and users) that are i) currently active in the system being protected and ii) that are not in breach of being outside the normal behavior benchmark. The autonomous response engine 140 can have a discovery module to i) discover capabilities of each node being protected device and the other cyber security devices (e.g., firewalls) in the system being protected and ii) discover mitigation actions they can take to counter and/or contain the detected threat to the system being protected, as well as iii) discover the communications needed to initiate those mitigation actions.

For example, the autonomous response engine 140 cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine 140 will take an autonomous mitigation action to, for example, shutdown the device or user account, block login failures, perform file modifications, block network connections, restrict the transmission of certain types of data, restrict a data transmission rate, remove or restrict user permissions, etc. The autonomous response engine 140 for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine 140 has a default set of autonomous mitigation actions shown on its user interface that it knows how to perform when the different types of cyber threats are equal to or above a user configurable threshold posed by this type of cyber threat. The autonomous response engine 140 is also configurable in its user interface to allow the user to augment and change what type of automatic mitigation actions, if any, the autonomous response engine 140 may take when different types of cyber threats that are equal to or above the configurable level of threat posed by a cyber threat.

Referring to FIG. 6, the cyber-attack simulator 105 using Artificial Intelligence-based simulations is communicatively coupled to a cyber security appliance 100, an open source (OS) database server 790, an email system 796, one or more endpoint computing devices 791A-B, and an IT network system 792 with one or more entities, over one or more networks 791/792 in the system being protected.

The cyber-attack simulator 105 with Artificial Intelligence-based simulations is configured to integrate with the cyber security appliance 100 and cooperate with components within the cyber security appliance 100 installed and protecting the network from cyber threats by making use of outputs, data collected, and functionality from two or more of a data store, other modules, and one or more AI models already existing in the cyber security appliance 100.

The cyber-attack simulator 105 may include a cyber threat generator module to generate many different types of cyber threats with the past historical attack patterns to attack the simulated system to be generated by the simulated attack module 750 that will digitally/virtually replicate the system being protected, such as a phishing email generator configured to generate one or more automated phishing emails to pentest the email defenses and/or the network defenses provided by the cyber security appliance 100. For example, the system being protected can be an email system and then the phishing email generator may be configured to cooperate with the trained AI models to customize the automated phishing emails based on the identified data points of the organization and its entities.

The email module and IT network module may use a vulnerability tracking module to track and profile, for example, versions of software and a state of patches and/or updates compared to a latest patch and/or update of the software resident on devices in the system/network. The vulnerability tracking module can supply results of the comparison of the version of software as an actual detected vulnerability for each particular node in the system being protected, which is utilized by the node exposure score generator and the cyber-attack simulator 105 with Artificial Intelligence-based simulations in calculating 1) the spread of a cyber threat and 2) a prioritization of remediation actions on a particular node compared to the other network nodes with actual detected vulnerabilities. The node exposure score generator is configured to also factor in whether the particular node is exposed to direct contact by an entity generating the cyber threat (when the threat is controlled from a location external to the system e.g., network) or the particular node is downstream of a node exposed to direct contact by the entity generating the cyber threat external to the network.

The node exposure score generator and the simulated attack module 750 in the cyber-attack simulator 105 cooperate to run the one or more hypothetical simulations of an actual detected cyber threat incident and/or a hypothetical cyberattack incident to calculate the node paths of least resistance in the virtualized instance/modeled instance of the system being protected. The progress through the node path(s) of least resistance through the system being protected are plotted through the various simulated instances of components of the graph of the system being protected until reaching a suspected end goal of the cyber-attack scenario, all based on historic knowledge of connectivity and behavior patterns of users and devices within the system under analysis. See for example FIGS. 7A and 7B. The simulated attack module 750, via a simulator and/or a virtual network clone creator, can be programmed to model and work out the key paths and devices in the system (e.g., a network, with its nets and subnets,) via initially mapping out the system being protected and querying the cyber security appliance on specific's known about the system being protected by the cyber security appliance 100. The simulated attack module 750 is configured to search and query, two or more of i) a data store, ii) modules in the detection engine, and iii) the one or more Artificial Intelligence (AI) models making up the cyber security appliance 100 protecting the actual network under analysis from cyber threats, on what, i) the data store, ii) the modules, and iii) the one or more AI models in the cyber security appliance 100, already know about the nodes of the system, under analysis to create the graph of nodes of the system being protected. Thus, the cyber-attack simulator 105 with Artificial Intelligence-based simulations is configured to construct the graph of the virtualized version of the system from knowledge known and stored by modules, a data store, and one or more AI models of a cyber security appliance 100 protecting an actual network under analysis. The knowledge known and stored is obtained at least from ingested traffic from the actual system under analysis. Thus, the virtualized system, and its node components/accounts connecting to the network, being tested during the simulation are up to date and accurate for the time the actual system under analysis is being tested and simulated because the cyber-attack simulator 105 with Artificial Intelligence-based simulations is configured to obtain actual network data collected by two or more of 1) modules, 2) a data store, and 3) one or more AI models of a cyber security appliance protecting the actual network under analysis from cyber threats. The simulated attack module 750 will make a model incorporating the actual data of the system through the simulated versions of the nodes making up that system for running simulations on the simulator. Again, a similar approach is taken when the simulated attack module 750 uses a clone creator to spin up and create a virtual clone of the system being protected with virtual machines in the cloud.

The cyber-attack simulator 105 with Artificial Intelligence-based simulations is configured to simulate the compromise of a spread of the cyber threat being simulated in the simulated cyber-attack scenario, based on historical and/or similar cyber threat attack patterns, between the devices connected to the virtualized network, via a calculation on an ease of transmission of the cyber threat algorithm, from 1) an originally compromised node by the cyber threat, 2) through to other virtualized/simulated instances of components of the virtualized network, 3) until reaching a suspected end goal of the cyber-attack scenario, including key network devices. The cyber-attack simulator 105 with Artificial Intelligence-based simulations also calculates how likely it would be for the cyber-attack to spread to achieve either of 1) a programmable end goal of that cyber-attack scenario set by a user, or 2) set by default an end goal scripted into the selected cyber-attack scenario.

The email module and the IT network module can include a profile manager module. The profile manager module is configured to maintain a profile tag on all of the devices connecting to the actual system/network under analysis based on their behavior and security characteristics and then supply the profile tag for the devices connecting to the virtualized instance of the system/network when the construction of the graph occurs. The profile manager module is configured to maintain a profile tag for each device before the simulation is carried out; and thus, eliminates a need to search and query for known data about each device being simulated during the simulation. This also assists in running multiple simulations of the cyberattack in parallel.

The cyber-attack simulator 105 with Artificial Intelligence-based simulations module is configured to construct the graph of the virtualized system, e.g. a network with its nets and subnets, where two or more of the devices connecting to the virtualized network are assigned with different weighting resistances to malicious compromise from the cyber-attack being simulated in the simulated cyber-attack scenario based on the actual cyber-attack on the virtualized instance of the network and their node vulnerability score. In addition to a weighting resistance to the cyberattack, the calculations in the model for the simulated attack module 750 factor in the knowledge of a layout and connection pattern of each particular network device in a network, an amount of connections and/or hops to other network devices in the network, how important a particular device (a key importance) determined by the function of that network device, the user(s) associated with that network device, and the location of the device within the network. Note, multiple simulations can be conducted in parallel by the orchestration module. The simulations can occur on a periodic regular basis to pentest the cyber security of the system and/or in response to a detected ongoing cyberattack in order to get ahead of the ongoing cyberattack and predict its likely future moves. Again, the graph of the virtualize instance of the system is created with two or more of 1) known characteristics of the network itself, 2) pathway connections between devices on that network, 3) security features and credentials of devices and/or their associated users, and 4) behavioral characteristics of the devices and/or their associated users connecting to that network, which all of this information is obtained from what was already know about the network from the cyber security appliance.

During an ongoing cyberattack, the simulated attack module 750 is configured to run the one or more hypothetical simulations of the detected cyber threat incident and feed details of a detected incident by a cyber threat module in the detection engine into the collections module of the cyber-attack simulator 105 using Artificial Intelligence-based simulations. The simulated attack module 750 is configured to run one or more hypothetical simulations of that detected incident in order to predict and assist in the triggering an autonomous response by the autonomous response engine 140 and then restoration by the restoration engine to the detected incident.

The simulated attack module 750 ingests the information for the purposes of modeling and simulating a potential cyberattacks against the network and routes that an attacker would take through the network. The simulated attack module 750 can construct the graph of nodes with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the system being protected under analysis. Correspondingly, the calculated likelihood of the compromise and timeframes for the spread of the cyberattack is tailored and accurate to each actual device/user account (e.g., node) being simulated in the system because the cyber-attack scenario is based upon security credentials and behavior characteristics from actual traffic data fed to the modules, data store, and AI models of the cyber security appliance.

The cyber-attack simulator 105 with its Artificial Intelligence trained on how to conduct and perform cyberattack in a simulation in either a simulator or in a clone creator spinning up virtual instances on virtual machines will take a sequence of actions and then evaluate the actual impact after each action in the sequence, in order to yield a best possible result to contain/mitigate the detected threat while minimizing the impact on other network devices and users that are i) currently active and ii) not in breach, from different possible actions to take. Again, multiple simulations can be run in parallel so that the different sequences of mitigation actions and restoration actions can be evaluated essentially simultaneously. The cyber-attack simulator 105 with Artificial Intelligence-based simulations in the cyber-attack simulator 105 is configured to use one or more mathematical functions to generate a score and/or likelihood for each of the possible actions and/or sequence of multiple possible actions that can be taken in order to determine which set of actions to choose among many possible actions to initiate. The one or more possible actions to take and their calculated scores can be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the cyber threat detection engine, the autonomous response engine 140, and the cyber-security restoration engine 190, respectively, to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The cyber-attack simulator cooperates with the AI models modelling a normal pattern of life for entities/nodes in the system being protected.

The simulated attack module 750 is programmed itself and can cooperate with the artificial intelligence in the restoration engine to factor an intelligent prioritization of remediation actions and which nodes (e.g., devices and user accounts) in the simulated instance of the system being protected should have a priority compared to other nodes.

This can also be reported out to assist in allocating human security team personnel resources that need human or human approval to restore the nodes based on results of the one or more hypothetical simulations of the detected incident.

Note, the cyberattack simulator 105, when doing attack path modelling, does not need to not calculate every theoretically possible path from the virtualized instance of the source device to the end goal of the cyber-attack scenario but rather a set of the most likely paths, each time a hop is made from one node in the virtualized network to another device in the virtualized network, in order to reduce an amount of computing cycles needed by the one or more processing units as well as an amount of memory storage needed in the one or more non-transitory storage mediums.

FIG. 8 illustrates a block diagram of an embodiment of the AI-based cyber security appliance 100 with the security awareness training system 203 and other Artificial Intelligence-based engines plugging in as an appliance platform to protect a system. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Referring back to FIG. 4, a computer system within a building, can use the cyber security appliance 100 to detect and thereby attempt to prevent threats to computing devices within its bounds. In this exemplary embodiment of the cyber security appliance 100 with the multiple Artificial Intelligence-based engines is implemented on a computer. The computer has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in the computer builds and maintains a dynamic, ever-changing model of the 'normal behavior' of each user and machine within the system. The approach is based on Bayesian mathematics, and monitors all interactions, events, and communications within the system-which computer is talking to which, files that have been created, networks that are being accessed.

For example, a second computer is-based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation and/or autonomous action.

The cyber security appliance 100 is built to deal with the fact that today's attackers are getting stealthier and an attacker/malicious agent may be 'hiding' in a system to ensure that they avoid raising suspicion in an end user, such as by slowing their machine down. The Artificial Intelligence model(s) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the network by analyzing data on the activity on the network at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance's 100 unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The models in the cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory storage devices in an executable format to be executed by one or more processors. The computer readable storage medium may be non-transitory and does not include radio or other carrier waves. The computer readable storage medium could be, for example, a physical computer readable storage medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

FIG. 9 illustrates a block diagram of an embodiment of one or more computing devices that can be a part of the Artificial Intelligence-based cyber security system including the multiple Artificial Intelligence-based engines and the security awareness training system 203 discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A software engine is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A cyber security system, comprising:

a hardware recognition module configured to detect when behavioral activity by an end user on an endpoint device creates one or more of i) a model breach indicative of a potential cyber threat and ii) a violation of a network policy, an email policy, or a cloud policy, an hardware authentication module configured to cooperate with the recognition module to provide just-in-time cyber security awareness training on a display screen of the endpoint device associated with the end user, at a time when the behavioral activity by the end user on the endpoint device creates the one or more of i) the model breach indicative of the potential cyber threat and ii) the violation of the network policy, the email policy, or the cloud policy, wherein the authentication module is configured to cooperate with a hardware mapping module and a hardware customized training module to provide the just-in-time cyber security awareness training on the endpoint device associated with the end user at the time when the behavioral activity by the end user on the endpoint device triggers a need for the cyber security awareness training, where the mapping module is configured to correlate the just-in-time cyber security awareness training that to the behavioral activity by the end user on the endpoint device that created the model breach or the violation, and where instructions implemented in software for the recognition module, the mapping module, the customized training module, and the authentication module are configured to be stored in one or more non-transitory storage mediums to be executed by one or more processing units and each of the recognition module, the authentication module and the mapping module of the cyber security system is implemented with (i) electronic circuits, (ii) as software stored in the one or more non-transitory storage mediums and executed by one or more processors, or (iii) any combination of electronic circuits and software.

2. The cyber security system of claim 1, wherein the recognition module is further configured to detect iii) a misconfiguration of a setting for a device associated with a cloud network, an email network, or an IT network, and then cooperate with the authentication module to provide the just-in-time cyber security awareness training on the display screen of the endpoint device associated with the end user to train on a proper configuration for the setting of the device.

3. The cyber security system of claim 1, further comprising:

an endpoint agent resident on the endpoint device that is configured to monitor the behavioral activity by the end user occurring on the endpoint device, where the endpoint agent is configured to report the behavioral activity by the end user on the endpoint device through a secure communication channel to a cyber security appliance protecting a network utilized by the end user, where the cyber security appliance is configured to protect the network that is used by the end user from potential cyber threats.

4. The cyber security system of claim 1, wherein the authentication module is further configured to generate a token with a client ID tied to the end user to provide the just-in-time cyber security awareness training on the display screen of the endpoint device and then send a secure link associated with the token with the client ID to an endpoint agent on the end user's endpoint device, which allows the end user to access to the cyber security awareness training when the end user activates the secure link without having to go through supplying the end user's authentication information or log-in details.

5. The cyber security system of claim 1, wherein the recognition module is configured to cooperate with an Artificial Intelligence model trained to model a pattern of life specific to that end user, which customizes the detection of when the behavioral activity by the end user on the endpoint device is unusual enough for that end user to trigger the one or more of i) the model breach indicative of the potential cyber threat and ii) the violation of the network policy, the email policy, or the cloud policy to the end user.

6. The cyber security system of claim 1, wherein the customized training module has both a static content component on cyber security awareness training as well as a dynamic content component to supplement the cyber security awareness training to customize the just-in-time cyber security awareness training with specific examples from the end user's current or previous behavior, where the static training from the static content component has pre-generated static training scenarios associated with the detected model breach or the policy violation and is configured to work with the dynamic content component to bring in and populate specific examples for that end user that are contextually relevant for the end user based upon that end user's history and current activity that the end user is engaging in.

7. The cyber security system of claim 1, wherein the authentication module and the customized training module cooperate to actively influence a behavior of the end user on the endpoint device by directly contacting the end user while in an act of performing that activity when the behavioral activity by the end user on the endpoint device triggers the need for the cyber security awareness training.

8. The cyber security system of claim 1, wherein the authentication module is configured to cooperate with the customized training module to allow contextual relevant training in the cyber security awareness training based upon real-world examples of behavior of the end user to be deployed directly to the end user on their endpoint device without requiring the end user to log into an entirely separate platform to host and engage in the just-in-time cyber security awareness training.

9. The cyber security system of claim 1, wherein a hardware tracking module is configured to track a completion state by the end user of the just-in-time cyber security awareness training and is configured to work with the customized training module to alter the just-in-time cyber security awareness training when the end user repeatedly violates a same policy and model breach.

10. The cyber security system of claim 1, further comprising:

a hardware feedback module configured to supply feedback to a cyber security appliance and its models for detecting a potential cyber threat, based upon a risk associated with the end user and their interactions with the just-in-time cyber security awareness training.

11. A method for a cyber security system, comprising:

providing a hardware recognition module to detect when behavioral activity by an end user on an endpoint device creates one or more of i) a model breach indicative of a potential cyber threat and ii) a violation of a network policy, an email policy, or a cloud policy, providing an hardware authentication module to cooperate with the recognition module to provide just-in-time cyber security awareness training on a display screen of the endpoint device associated with the end user, at a time when the behavioral activity by the end user on the endpoint device creates the one or more of i) the model breach indicative of the potential cyber threat and ii) the violation of the network policy, the email policy, or the cloud policy, providing the authentication module to cooperate with a hardware mapping module and a hardware customized training module to provide the just-in-time cyber security awareness training on the endpoint device associated with the end user at the time when the behavioral activity by the end user on the endpoint device triggers a need for the cyber security awareness training, and providing the mapping module to correlate the just-in-time cyber security awareness training that to the behavioral activity by the end user on the endpoint device that created the model breach or the violation.

12. The method of claim 11, further comprising:

providing the recognition module to detect iii) a misconfiguration of a setting for a device associated with a cloud network, an email network, or an IT network, and then cooperate with the authentication module to provide the just-in-time cyber security awareness training on the display screen of the endpoint device associated with the end user to train on a proper configuration for the setting of the device.

13. The method of claim 11, further comprising:

providing a hardware endpoint agent to be resident on the endpoint device to monitor the behavioral activity by the end user occurring on the endpoint device, and providing the endpoint agent to report the behavioral activity by the end user on the endpoint device through a secure communication channel to a cyber security appliance protecting a network utilized by the end user, where the cyber security appliance is configured to protect the network that is used by the end user from potential cyber threats.

14. The method of claim 11, further comprising:

providing the authentication module to generate a token with a client ID tied to the end user to provide the just-in-time cyber-security awareness training on the display screen of the endpoint device and then send a secure link associated with the token with the client ID to an endpoint agent on the end user's endpoint device, which allows the end user to access to the cyber-security awareness training when the end user activates the secure link without having to go through supplying the end user's authentication information or log-in details.

15. The method of claim 11, further comprising:

providing the recognition module to cooperate with an Artificial Intelligence model trained to model a pattern of life specific to that end user, which customizes the detection of when the behavioral activity by the end user on the endpoint device is unusual enough for that end user to trigger the one or more of i) the model breach indicative of the potential cyber threat and ii) the violation of the network policy, the email policy, or the cloud policy to the end user.

16. The method of claim 11, further comprising:

providing the customized training module to have both a static content component on cyber security awareness training as well as a dynamic content component to supplement the cyber security awareness training to customize the just-in-time cyber security awareness training with specific examples from the end user's current or previous behavior, where the static training from the static content component has pre-generated static training scenarios associated with the detected model breach or the policy violation and works with the dynamic content component to bring in and populate specific examples for that end user that are contextually relevant for the end user based upon that end user's history and current activity that the end user is engaging in.

17. The method of claim 11, further comprising:

providing the authentication module and the customized training module cooperate to actively influence a behavior of the end user on the endpoint device by directly contacting the end user while in an act of performing that activity when the behavioral activity by the end user on the endpoint device triggers the need for the cyber security awareness training.

18. The method of claim 11, further comprising:

providing the authentication module to cooperate with the customized training module to allow contextual relevant training in the cyber security awareness training based upon real-world examples of behavior of the end user to be deployed directly to the end user on their endpoint device without requiring the end user to log into an entirely separate platform to host and engage in the just-in-time cyber security awareness training.

19. The method of claim 11, further comprising:

providing a hardware feedback module to supply feedback to a cyber security appliance and its models for detecting a potential cyber threat, based upon a risk associated with the end user and their interactions with the just-in-time cyber security awareness training.

20. A non-transitory computer readable storage medium comprising computer readable code operable, when executed by one or more processing units in a computing system to instruct a computing device to perform the method of claim 11.

* * * * *